(12) United States Patent
Prins et al.

(10) Patent No.: US 11,465,315 B2
(45) Date of Patent: Oct. 11, 2022

(54) SPREADER ELEMENT FOR MANUFACTURING UNIDIRECTIONAL FIBER-REINFORCED TAPES

(71) Applicant: Fibre Reinforced Thermoplastics B.V., Lelystad (NL)

(72) Inventors: Rinus Prins, Lelystad (NL); Gerard de Weerd, Lelystad (NL)

(73) Assignee: FIBRE REINFORCED THERMOPLASTICS B.V., Swifterbant (NL)

( * ) Notice: Subject to any disclaimer, the term of this patent is extended or adjusted under 35 U.S.C. 154(b) by 11 days.

(21) Appl. No.: 17/177,294

(22) Filed: Feb. 17, 2021

(65) Prior Publication Data

US 2021/0178637 A1 Jun. 17, 2021

Related U.S. Application Data

(63) Continuation of application No. 15/556,845, filed as application No. PCT/IB2016/000392 on Mar. 10, 2016, now Pat. No. 10,953,569.

(Continued)

(51) Int. Cl.
*B29B 15/14* (2006.01)
*B29C 70/20* (2006.01)
(Continued)

(52) U.S. Cl.
CPC .............. *B29B 15/14* (2013.01); *B29B 15/12* (2013.01); *B29C 70/20* (2013.01); *B29C 70/506* (2013.01);
(Continued)

(58) Field of Classification Search
None
See application file for complete search history.

(56) References Cited

U.S. PATENT DOCUMENTS

| | | | |
|---|---|---|---|
| 5,330,595 A * | 7/1994 | Held | B29C 43/28 156/244.27 |
| 6,094,791 A | 8/2000 | Akase et al. | |
| 2013/0106014 A1* | 5/2013 | Ishibashi | B29B 15/125 264/103 |

FOREIGN PATENT DOCUMENTS

| | | |
|---|---|---|
| CN | 202347154 U | 7/2012 |
| CN | 204039613 U | 12/2014 |

(Continued)

OTHER PUBLICATIONS

European Search Report and Written Opinion for the European Patent Application No. EP19196230, dated Jul. 29, 2020, 7 pages.

*Primary Examiner* — Jeffry H Aftergut
(74) *Attorney, Agent, or Firm* — KDB Firm PLLC

(57) ABSTRACT

Disclosed is a fiber-reinforced composite and methods and apparatuses for making the same. Some fiber-reinforced composites include a matrix material including a thermoplastic material and a non-woven fibrous region having a plurality of continuous fibers dispersed in the matrix material, wherein the width and the length of the non-woven fibrous region are substantially equal to the width and the length, respectively, of the liber-reinforced composite, wherein the non-woven fibrous region has a mean relative area fiber coverage (RFAC) (%) of from 65 to 90 and a coefficient of variance (COV) (%) of from 3 to 20, and wherein each of the plurality of continuous fibers is substantially aligned with the length of the fiber-reinforced composite.

11 Claims, 25 Drawing Sheets

Related U.S. Application Data

(60) Provisional application No. 62/131,002, filed on Mar. 10, 2015.

(51) Int. Cl.
| | |
|---|---|
| *D02J 1/18* | (2006.01) |
| *B29C 70/50* | (2006.01) |
| *D01D 11/02* | (2006.01) |
| *C08J 5/24* | (2006.01) |
| *B29B 15/12* | (2006.01) |
| *D04H 3/004* | (2012.01) |
| *D04H 3/011* | (2012.01) |
| *B29K 23/00* | (2006.01) |
| *B29K 77/00* | (2006.01) |
| *B29K 309/08* | (2006.01) |

(52) U.S. Cl.
CPC .............. *C08J 5/244* (2021.05); *D01D 11/02* (2013.01); *D02J 1/18* (2013.01); *D04H 3/004* (2013.01); *D04H 3/011* (2013.01); *B29K 2023/065* (2013.01); *B29K 2023/12* (2013.01); *B29K 2077/00* (2013.01); *B29K 2309/08* (2013.01)

(56) References Cited

FOREIGN PATENT DOCUMENTS

| | | | |
|---|---|---|---|
| CN | 204844391 U | | 12/2015 |
| JP | 4-272808 A | * | 9/1992 |
| JP | 4-272849 A | * | 9/1992 |
| JP | 07100830 A | | 4/1995 |
| JP | H0985744 A | | 3/1997 |
| JP | 2011236974 A | | 11/2011 |

\* cited by examiner

SPREADER ELEMENT FOR MANUFACTURING UNIDIRECTIONAL FIBER-REINFORCED TAPES

CROSS REFERENCE TO RELATED APPLICATIONS

"This is a continuation of U.S. nonprovisional patent application Ser. No. 15/556,845, filed Sep. 8, 2017, which is a national stage application filed under 35 U.S.C. § 371 of international application PCT/IB2016/000392, filed Mar. 10, 2016, which claims priority to U.S. Provisional Patent Application No. 62/131,002, filed Mar. 10, 2015, the entirety of which applications are hereby incorporated by reference herein."

BACKGROUND OF THE INVENTION

A. Field of the Invention

The present invention generally concerns unidirectional (UD) fiber-reinforced composites and apparatus and methods for making the same. In particular, some UD fiber-reinforced composites have a non-woven fibrous region or layer comprising a plurality of continuous fibers dispersed in a polymeric matrix, where the non-woven fibrous region has a substantially uniform density as defined by a mean relative fiber area coverage (RFAC) (%) and an associated coefficient of variance (COV) (%). The polymeric matrix can be a thermoplastic or thermoset polymeric matrix.

B. Description of Related Art

Composite materials can include fibers dispersed in resin/polymeric matrix. Such composite materials are useful in various industries, such as, for example, in the consumer electronics, ballistics, aerospace, and transportation industries. A UD composite is a composite having fibers that extend in substantially one direction. UD composites, having anisotropic properties, can be used to make articles of manufacture having properties that vary in one or more directions or dimensions.

An example of UD composite is a LD tape or prepreg, which may be characterized as a thin strip or band of continuous UD fibers (e.g, glass fibers, carbon fibers, and/or the like) impregnated with a polymer resin. Such UD tapes can have a width of from 1 to 15 cm, perhaps wider, and a thickness of less than 1 mm. Such UD tapes may be provided on a spool or reel. UD tapes are described in U.S. Pat. No. 6,919,118 to Bompard et al. and U. S. Publication No. 2014/0147620 to Li et al.

In theory, all fibers in a UD composite should be uniform, parallel, and continuous; however, in practice, such properties are difficult to achieve. For example, commonly available UD tapes may have fibrous regions or layers that include non-uniform arrangements of fibers, air pockets or voids, broken fibers, and/or the like. There have been numerous attempts to address these problems.

U.S. Pat. No. 5,496,602 to Wai attempts to solve these problems via forming a UD tape by placing UD fibers between a pair of epoxy thermoset resin films and heating the fibers and films. The UD tape is later injected with a polymer to fill interstices between the fibers. Due to fiber movement during application of the films, the resulting UD tape may include a non-uniform arrangement of fibers as well as air pockets or voids. Further, Wai's method includes a number of relatively complex steps as well as the introduction of materials, such as epoxy, that may not be desirable.

Some attempts to solve these problems include the use of fiber spreading devices. U.S. Pat. No. 5,101,542 to Narihito describes such a fiber spreading device, which includes a plurality of roller elements, each having a continuously convex outer surface that bulges at its center. U.S. Pat. No. 8,191,215 to Meyer describes a rotating fiber spreading device that includes wings, each having an outer-most spreading edge that is continuously convex in cross-section. U.S. Pat. No. 8,470,114 and U.S. Publication No. 2013/0164501 to Jung et al. each describe methods of spreading fibers by passing the fibers over a series of convex bars. U.S. Pat. No. 6,585,842 to Bompard et al. describes a method of spreading fibers by passing the fibers over a series of curved (e.g., banana-shaped) rollers.

Some attempts to solve the above-identified problems include the use of impregnation devices. Typical impregnation processes include the use of baths of polymeric solutions through which a fiber layer may be moved. In such a process, the polymeric solution may be pressed into the fiber layer using a roller. Wai's process, described above, impregnates a fiber layer by pressing polymer films on opposing sides of the layer into the layer. Each of these processes are similar in that they involve pressing a polymeric resin material into a fiber layer to achieve impregnation of the fiber layer.

While such fiber spreading and impregnation devices and processes may be used to prepare a UD tape, such a UD tape still suffers from non-uniform fiber arrangement and air pockets or voids in the matrix material. For example, FIG. 1 includes cross-sectional images of commercially available UD composites, obtained using a scanning electron microscope. These commercially available UD composites possess fibrous regions having non-uniform fiber arrangements, and thus non-uniform densities, as well as voids and air pockets in the polymeric matrix.

SUMMARY OF THE INVENTION

Discoveries have been made that solve, or, at least alleviate, the problems of non-uniform distribution of fibers, voids and air pockets, and/or the like in UD composite tapes. In particular, fiber-reinforced composites of the present disclosure can have a non-woven fibrous region or layer comprising a plurality of continuous fibers dispersed in a polymeric matrix. The polymeric matrix can be a thermoset, or more preferably, a thermoplastic polymeric matrix. Thermoplastic polymeric matrices may be moldable and pliable above a certain temperature and may solidify below the temperature. Once cured or cross-linked, thermoset polymeric matrices tend to lose the ability to become moldable or pliable with increased temperature. Polymeric matrices can be included in a composition having thermoplastic or non-thermoplastic polymer(s), additives, and/or the like. The non-woven fibrous region can have a substantially uniform density as defined by a mean relative fiber area coverage (RFAC) (%) of from 65 to 90 and a coefficient of variance (COV) (%) of from 3 to 20, preferably a mean RFAC (%) of from 69 to 90 and a COV (%) of from 3 to 15, or more preferably a mean RFAC (%) of from 75 to 90 and a COV (%) of from 3 to 8. A fiber-reinforced composite of the present disclosure, at least by virtue of having such a substantially uniform density, may include a volume fraction of voids that is less than 5%, preferably less than 3%, or more preferably less than 1%. Fiber-reinforced composites of the present disclosure can be used in a variety of articles of manufacture.

Also disclosed are systems and methods for spreading fiber bundle(s) or tow(s) into spreaded fiber layer(s) and/or impregnating spreaded fiber layer(s) with a matrix material to produce fiber-reinforced composites of the present disclosure. Some systems include both a spreading unit and an impregnation unit, with the impregnation unit positioned downstream from the spreading unit. Such a spreading unit can utilize a spreading element having two different surfaces (e.g., a convex surface and a concave or planar surface) that meet at a (e.g., rounded) edge to spread fibers from fiber bundle(s) in an efficient and uniform manner into spreaded or flattened fiber layer(s). Such an impregnation unit may be configured to receive at least two spreaded or flattened fiber layers, position a thermoplastic or thermoset polymeric resin between the two fiber layers, and press the two fiber layers into the resin, thereby forming a non-woven fibrous region of a composite of the present disclosure. Each of the two spreaded or flattened fiber layers can include fibers from one or more fiber bundles, such as, for example, 1, 2, 3, 4, 5, 6, 7, 8, 9, 10, or more fiber bundles.

In one aspect, there is disclosed a fiber-reinforced composite that includes a polymeric matrix and a non-woven fibrous region comprising a plurality of continuous fibers dispersed in the polymeric matrix, the non-woven fibrous region having a substantially uniform density as defined by a mean RFAC (%) of from 65 to 90 and a COV (%) of from 3 to 20. In more preferred embodiments, the non-woven fibrous region has a mean RFAC (%) of from 69 to 90 and a COV (%) of from 3 to 15. In still further preferred embodiments, the non-woven fibrous region has a mean RFAC (%) of from 75 to 90 and a COV (%) of from 3 to 8. The width and the length of the non-woven fibrous region can be substantially similar to the width and the length, respectively, of the fiber-reinforced composite, the plurality of continuous fibers can be unidirectionally oriented and substantially parallel to a first axis, and the fiber-reinforced composite can include, by volume, at least 35 to 70%, preferably 40 to 65%, or more preferably 45 to 55%, of the plurality of continuous fibers. A fiber-reinforced composite can have a width of up to 6 meters and a length of up to 10,000 meters.

In some fiber-reinforced composites, a first fiber layer and a second fiber layer are pressed or squeezed together to form the non-woven fibrous region. The non-woven fibrous region can include fibers from a plurality of fiber bundles, each bundle including from 1,000 to 60,000 individual filaments. The average cross-sectional area of the individual filaments can be from 7 $\mu m^2$ to 800 $\mu m^2$. Non-limiting examples of continuous fibers include glass fibers, carbon fibers, aramid fibers, polyethylene fibers, polyester fibers, polyamide fibers, basalt fibers, steel fibers, or a combination thereof. Such glass fibers can have an average filament cross-sectional area of from 75 $\mu m^2$ to 460 $\mu m^2$ and such carbon fibers can have an average filament cross-sectional area of from 7 $\mu m^7$ to 60 $\mu m^2$.

In some fiber-reinforced composites, the polymeric matrix can be a thermoplastic matrix or a thermoset matrix, with thermoplastic matrices being preferred. The polymeric matrix of a fiber-reinforced composite can be structured such that the fiber-reinforced composite has a first polymeric-rich region and a second polymeric-rich region, where the non-woven fibrous region is positioned between the first and second polymeric-rich regions. Polymeric-rich regions include those having less than 10%, less than 5%, or less than 1%, by volume, of continuous fibers. The width and the length of polymeric-rich region(s) can be substantially similar to the width and the length, respectively, of the respective fiber-reinforced composite. In one embodiment, the thickness of the first polymeric-rich region and the thickness of the second polymeric-rich region are the same or are within 10%, preferably 5%, and more preferably 1%, of one another. In one embodiment, the thicknesses of the first and second polymeric-rich regions vary by more than 10, 15, or 20% with respect to one another. Each of the first and second polymeric-regions can have a substantially uniform density (e.g., mass per unit volume) throughout the polymeric-rich region.

The polymeric matrix of fiber-reinforced composites of the present disclosure can include thermoplastic polymers, thermoset polymers, co-polymers thereof, or blends thereof. Non-limiting examples of thermoplastic polymers include polyethylene terephthalate (PET), polycarbonates (PC), polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) or derivatives thereof, thermoplastic elastomers (TPE), terephthalic acid (TPA) elastomers, poly(cyclohexanedimethylene terephthalate) (PCT), polyethylene naphthalate (PEN), polyamides (PA), polysulfone sulfonate (PSS), polyether ether ketone (PEEK), polyether ketone ketone (PEKK), acrylonitrile butyldiene styrene (ABS), polyphenylene sulfide (PPS), co-polymers thereof, or blends thereof. More preferred thermoplastic polymers include polypropylene, polyamides, polyethylene terephthalate, polycarbonates (PC), polybutylene terephthalate, poly(phenylene oxide) (PPO), polyetherimide, polyethylene, co-polymers thereof, or blends thereof. Even more preferred thermoplastic polymers include polypropylene, polyethylene, polyamides, polycarbonates (PC), co-polymers thereof, or blends thereof.

Non-limiting examples of thermoset polymers suitable for use as a matrix material in the present fiber-reinforced composites include unsaturated polyester resins, polyurethanes, bakelite, duroplast, urea-formaldehyde, diallylphthalate, epoxy resin, epoxy vinylesters, polyimides, cyanate esters of polycyanurates, dicyclopentadiene, phenolics, benzoxazines, co-polymers thereof, or blends thereof. A polymeric matrix of one of the present fiber-reinforced composites can be included in a composition along with one or more additives. Non-limiting examples of such additives include coupling agents to promote adhesion between the polymeric matrix and continuous fibers, antioxidants, heat stabilizers, flow modifiers, flame retardants, UV stabilizers, UV absorbers, impact modifiers, cross-linking agents, colorants, or a combination thereof.

Some of the present fiber-reinforced composites do not include polypropylene and do not include glass fibers. Some of the present fiber-reinforced composites do not include polyethylene and do not include glass fibers. Some of the present fiber-reinforced composites include polypropylene and/or polyethylene, but do not include glass fibers. Some of the present fiber-reinforced composites include glass fibers, but do not include polypropylene or polyethylene.

Also disclosed are laminates including fiber-reinforced composites of the present disclosure. Such laminates can include 2, 3, 4, 5, 6, 7, 8, 9, 10, or more plies, where one ply may consist of one fiber-reinforced composite of the present disclosure. In some laminates, at least two plies are positioned such that their respective fibers are substantially parallel to a first axis. In some laminates, at least two plies are positioned such that their respective fibers are not parallel to each other. Fiber-reinforced composites and laminates of the present disclosure can be assembled or processed into two-dimensional or three-dimensional structures, such as, for example, via winding and/or lay-up techniques.

Also disclosed is an article of manufacture that includes any of the fiber-reinforced composites or laminates of the present disclosure. Non-limiting examples of such articles of manufacture include automotive parts (e.g., doors, hoods, bumpers, A-beams, B-beams, battery casings, bodies in white, reinforcements, cross beams, seat structures, suspension components, hoses, and/or the like), braided structures, woven structures, filament wound structures (e.g., pipes, pressure vessels, and/or the like), aircraft parts (e.g., wings, bodies, tails, stabilizers, and/or the like), wind turbine blades, boat hulls, boat decks, rail cars, sporting goods, window lineals, pilings, docks, reinforced wood beams, retrofitted concrete structures, reinforced extrusion or injection moldings, hard disk drive (HDD) or solid state drive (SSD) casings, TV frames, smartphone mid-frames, smartphone unibody casings, tablet mid-frames, tablet unibody casings, TV stands or tables, lap-top computer casings, ropes, cables, protective apparel (e.g., cut-resistant gloves, helmets, and/or the like), armor, plates, and/or the like.

The present disclosure includes spreading units configured to spread one or more fiber bundles, each having a plurality of fibers, into one or more spreaded fiber layers. A fiber bundle can be spread in a direction that is perpendicular to a long dimension of the fiber bundle, thereby forming a spreaded or flattened fiber layer. A spreading unit can include a spreading element having at least one lobe comprising a first surface with a convex first profile and a second surface with a second profile that is different than the first profile, wherein the first and second surfaces meet to form a (e.g., rounded) edge, and wherein the lobe is configured to spread a plurality of fibers from a fiber bundle in a lateral direction when the plurality of fibers contact the first surface and the edge. Such a second profile can be substantially straight or concave. A spreading element can be positioned such that a plurality of fibers contacts the second surface and transitions to the first surface (e.g., across the edge). A spreading element can be positioned such that a plurality of fibers contacts the first surface and transitions to the second surface (e.g., across the edge). For a spreading element including two or more lobes, second surfaces of the two or more lobes can be contiguous, such that, for example, if the second surfaces are planar, the second surfaces cooperate to form a continuous flat surface.

In some spreading units, a spreading element can be rotated relative to a plurality of fibers being spread by the spreading element and about a longitudinal axis of the spreading element, such rotation can be in an oscillating fashion. A spreading element can be configured to oscillate relative to a plurality of fibers being spread by the spreading element and in a direction that is substantially perpendicular to the long dimension of the plurality of fibers. Such oscillation can be at an amplitude of from 0.1 to 20 mm, preferably 0.1 to 10 mm, and at a frequency of from 0.1 to 5 Hz, preferably 0.5 to 2 Hz.

In some spreading units, one or more holding elements can be positioned upstream and/or downstream of a spreading element, wherein each holding element is configured to reduce lateral movement of a plurality of fibers as the plurality of fibers are spread by the spreading element. Such holding element(s) can each include one or more grooves configured to receive the plurality of fibers.

A spreading unit of the present disclosure can include at least first and second spreading elements, the second spreading element being positioned downstream of the first spreading element. Lobe(s) of the second spreading element can be larger than lobe(s) of the first spreading element (e.g., by 1, 2, 3, 4, 5, 6, 7, 8, 9, 10, or more %) (e.g., in a length, width, height, radius, transverse dimension, and/or the like). The first and second spreading elements may cooperate to spread one or more fiber bundle(s) into one or more fiber layer(s). The first spreading element can include at least first and second lobes and the second spreading element can include at least third and fourth lobes, where the first and third lobes are configured to spread a first fiber bundle and the second and fourth lobes are configured to spread a second fiber bundle. Such a spreading unit can The spreading unit can include a third spreading element having at least fifth and sixth lobes and a fourth spreading element having at least a seventh and an eighth lobes, where the fifth and seventh lobes are configured to spread a third fiber bundle and the sixth and eighth lobes are configured so spread a fourth fiber bundle. The spreading unit can be configured to form a first flattened fiber layer from the first and second fiber bundles and a second flattened fiber layer from the third and fourth fiber bundles.

One or more tensioners can be positioned upstream of a spreading unit, each configured to tension one or more fiber bundle(s) during spreading of the fiber bundle(s). A heat source can be provided at, upstream of, and/or downstream of a spreading unit, the heat source configured to heat a plurality of fibers being spread by the spreading unit. A heat source may include an infrared heat source, a heated spreading element, a heated holding element, and/or the like. A fiber bundle feed unit can be positioned upstream of the spreading unit, the fiber bundle feed unit being configured to provide one or more fiber bundles to the spreading unit.

Also disclosed is a method for producing at least one flattened fiber layer from one or more fiber bundles, each having a plurality of fibers. Such a fiber bundle can include 1,000, 2,000, 3,000, 4,000, 5,000, 10,000, 20,000, 30,000, 40,000, 50,000 60,000, or more individual filaments. Such a flattened fiber layer can be produced at a rate of from 1 to 50 in/min, preferably 2 to 25 m/min, and more preferably from 8 to 15 m/minute.

Also disclosed is an impregnation unit for dispersing a plurality of fibers within a thermoplastic or thermoset polymer matrix material. The impregnation unit can include a first flattened fiber layer feed comprising a first flattened fiber layer, a second flattened fiber layer feed comprising a second flattened fiber layer, a thermoplastic or thermoset polymer matrix material feed comprising a thermoplastic or thermoset polymer matrix material and configured to dispose the matrix material between the first and second flattened fiber layers, and a pressing device configured to press the first and/or second flattened fiber layers into the matrix material. Such an impregnation unit can include one, two, three, or more rubbing elements configured to contact at least one of the first and second spreaded fiber layers after the spreaded fiber layer has been pressed into the matrix material and to oscillate in a direction that is substantially perpendicular to a long dimension of the spreaded fiber layer. Such rubbing elements may oscillate at an amplitude of from 0.1 to 20 mm, preferably 0.1 to 10 mm, and at a frequency of from 0.1 to 5 Hz, preferably 0.5 to 2 Hz. Each rubbing element can include a plurality of rounded segments, lobes, or convexities positioned laterally along its longitudinal axis.

A polymer matrix material feed can include an extruder configured to extrude the matrix material (e.g., as a sheet or a film; for example, out of a slit die) between the first and second flattened fiber layers. Such an extruder may reduce drip-related wastage. The extruder may be configured to provide material directly onto the first and/or second flattened fiber layers.

Also disclosed are methods for dispersing a plurality of fibers into a thermoplastic or thermoset polymeric matrix material. Some methods include obtaining a stack of a first flattened fiber layer, a second flattened fiber layer, and thermoplastic or thermoset polymeric matrix material disposed between the first and second flattened fibers, and pressing the first and/or second flattened fiber layers into the matrix material. Such pressing may be performed using stationary or rotating rollers, pins, rods, plates, and/or the like.

The present systems and methods may be used to produce a fiber-reinforced composite of the present disclosure at a rate of from 1 to 50 m/min, preferably 2 to 25 m/min, and more preferably 8 to 15 m/min.

Also disclosed is a composition including a first flattened fiber layer comprising a plurality of fibers from a first fiber bundle, a second flattened fiber layer comprising a plurality of fibers from a second fiber bundle, and a thermoplastic or thermoset polymer matrix material positioned between the first and second flattened fiber layers, wherein the first and/or second flattened fiber layers have been formed using spreading element(s) of the present disclosure. The thermoplastic or thermoset polymeric matrix material can comprise a sheet or a film into which the first and second spreaded fiber layers can be pressed to form a fiber-reinforced composite.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely, but not necessarily wholly, what is specified (and includes what is specified, e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "flattened" and "spreaded" are synonymous in the present application. As used in this disclosure, "flattened," "flattening," "spreaded," and "spreading" may each be used in connection with a process through which a fiber bundle is widened in a lateral direction, or a direction that is substantially perpendicular to a long dimension of the fiber bundle, such that, for example, the fiber bundle becomes thinner when viewed from the side. Typically, a fiber bundle can be flattened or spreaded such that a resulting flattened or spreaded fiber layer has, on average, a thickness or depth of 1 to 8 filaments, preferably 3 to 6 filaments, and more preferably 4 to 5 filaments. Nevertheless, other thicknesses or depths are also contemplated.

The term "non-woven" is used to describe a structure made of continuous fibers that does not have a woven architecture. In fiber-reinforced composites of the present disclosure, a non-woven fibrous region may include filaments that cross over other filaments. Such cross-over, which may affect the density of the fibrous region, does not change the non-woven nature of the fibrous region.

The term "ply" refers to a single layer, and "plies" is the plural form of ply.

The term "void" refers to a gas pocket within a fiber-reinforced composite. The void volume fraction of a composite may be determined by taking a cross-sectional image of the composite (e.g., using scanning electron microscopy, confocal microscopy, optical imaging, or other imaging techniques) and dividing the cross-sectional area of the matrix material by the cross-sectional area of the composite. Fibers in the fibrous region may be included in the cross-sectional area of the matrix material. To facilitate identification of the matrix material, a colored and/or fluorescent dye may be added to the matrix material.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "h as," or "includes" one or more steps possesses those one or more steps, but is not limited to possessing only those one or more steps.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. With respect to the term "consisting essentially of," a basic and novel characteristic of a fiber-reinforced composite of the present disclosure is its substantially uniform density, as defined by its mean RFAC (%) and COV (%).

Further, a device or system that is configured in a certain way is configured in at least that way, but it can also be configured in other ways than those specifically described.

The features of one embodiment may be applied to other embodiments, even though not described or illustrated, unless expressly prohibited by this disclosure or the nature of the embodiments.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment(s) depicted in the figures.

FIG. 7G is a cross-sectional side view of the spreading element of FIG. 7A, taken along line 7G-7G of FIG. 7A.

DETAILED DESCRIPTION

Figure 1:
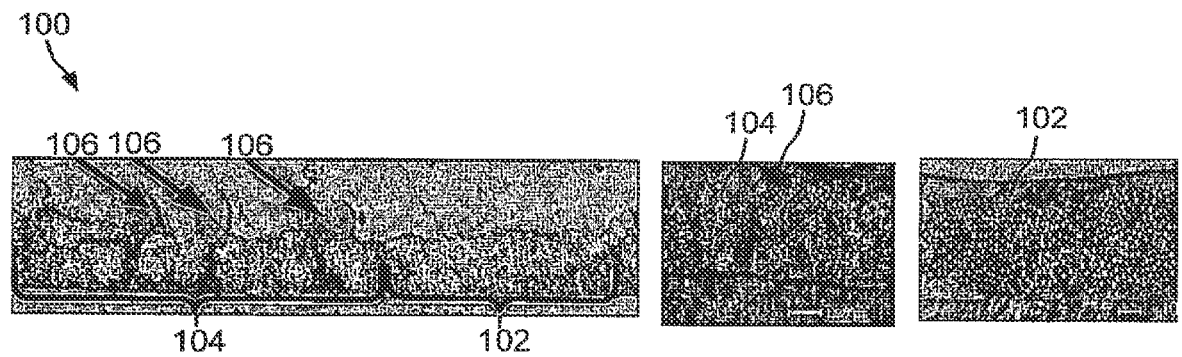
FIG. 1 includes cross-sectional images of prior art unidirectional fiber-reinforced composites.

Currently available fiber-reinforced composites may suffer from non-uniform arrangements of fibers and voids that can render the composites weak and susceptible to cracks and breakage that can ultimately lead to the failure of parts, components, devices, and the like including such composites. By comparison, fiber-reinforced composites of the present disclosure include a non-woven fibrous region having a substantially uniform density as defined by a mean relative fiber area coverage (RFAC) (%) and a coefficient of variance (COV) (%). Composites of the present disclosure have improved structural characteristics when compared with currently available composites.

Conventional apparatuses for spreading and/or impregnating fibers suffer from an inability to provide for sufficiently even spacing of the fibers and/or an inability to sufficiently prevent the fibers from moving during impregnation. Such uneven spacing and fiber movement can result in non-uniform fiber arrangement and voids in a resulting composite. In contrast, the spreading unit and the impregnation unit of the present disclosure can be used to prepare fiber-reinforced composites having substantially uniform densities, as described above.

These and other non-limiting aspects of the present invention are discussed in further detail in the following sections.

A. Fiber-Reinforced Composites

Fiber-reinforced composites of the present disclosure can have a thermoplastic or thermoset polymeric matrix and a non-woven fibrous region comprising a plurality of continuous fibers dispersed in the polymeric matrix. Typically, the width and the length of the non-woven fibrous region are substantially similar to the width and the length, respectively, of the fiber-reinforced composite Such fiber-reinforced composites can include, by volume, at least 35 to 70% of the plurality of continuous fibers.

Such a non-woven fibrous region can have a substantially uniform density as defined by a mean relative fiber area coverage (RFAC) (%) of from 65 to 90 and a coefficient of variance (COV) (%) of from 3 to 20, preferably a mean RFAC (%) of from 69 to 90 and a COV (%) of from 3 to 15, and most preferably a mean RFAC (%) of from 75 to 90 and a COV (%) of from 3 to 8.

1. Determining Density Uniformity

The density uniformities of the composites of the present disclosure are determined by using the following procedure:

1. A cross-sectional image of a thermoplastic or thermoset fiber-reinforced tape/composite is obtained via optical microscopy (e.g. confocal microscopy). The cross-sectional image is taken perpendicularly to the longitudinal axis of the fibers and has a length of at least 1500 μm and a width (e.g., measured along a thickness of the tape/composite) of at least 160 μm. In the Examples, a Keyence VK-X200 Camera with a 50× lens (Keyence VK-X200, Elmwood, N.J., USA) was used; however, other cameras or imaging devices can be used.
2. Cross hairs are drawn that bisect the length and the width of the cross-sectional image.
3. A first square box is drawn centered on the cross hairs and having sides equal to 40% of the thickness of the tape/composite.
4. Two sets of 5 adjacent square boxes, each square box having the same dimensions as the first square box, are drawn such that each set is on a respective side of the vertical or width-wise cross hair, adjacent to the first square box, and centered on the horizontal or length-wise cross-hair. A total of 11 boxes will be present, thereby offering 11 data points.
5. Fiber surface area, or the area occupied by fibers, in each of the 11 square boxes is measured and, for each square box, is represented as a percentage of the total area of the square box, referred to as area coverage (AC) (%).
6. A relative fiber area coverage (RFAC) (%) for each of the 11 square boxes is determined by dividing AC for the square box by the theoretical maximum possible AC, which may assume close packing of circular filaments, and multiplying by 100. A mean RFAC (%) is determined by averaging the RFACs of the 11 square boxes.

7. A coefficient of variance (COV) (%) is determined by dividing the standard deviation ($\sigma$) of the ACs by the average of the ACs and multiplying by 100.

The above procedure was used in the Examples section to calculate the mean RFAC and COV values of fiber-reinforced composites of the present disclosure and three comparative, commercially available composites.

2. Fiber-Reinforced Composite Dimensions

Figure 2:
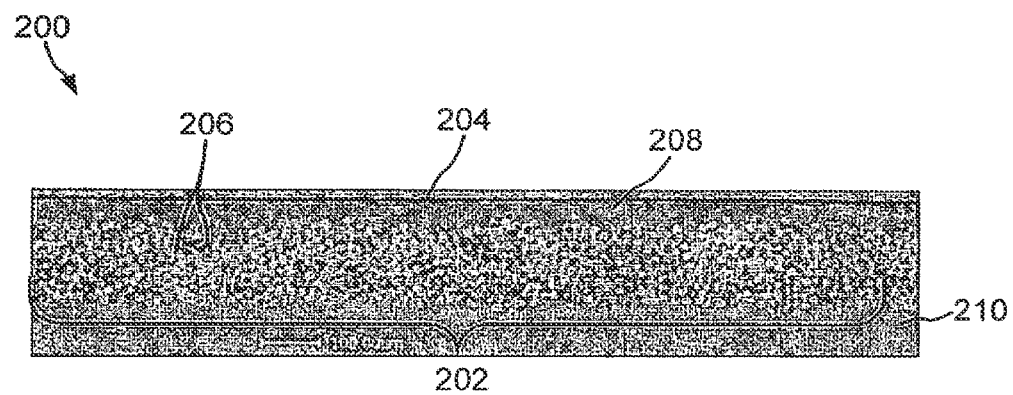
FIG. 2 is a cross-sectional confocal microscope image of a unidirectional fiber-reinforced composite of the present disclosure.
Figure 3:
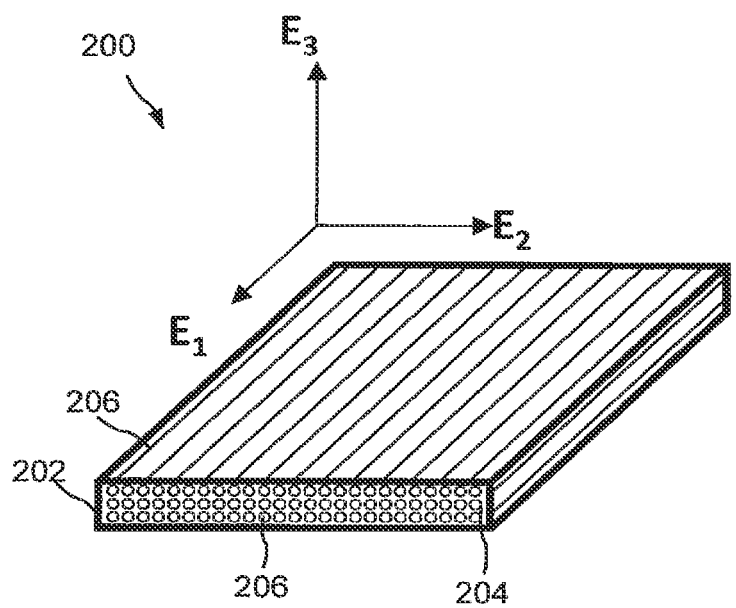
FIG. 3 is a schematic of a unidirectional fiber-reinforced composite of the present disclosure, where a length, width, and thickness of the composite may be measured along axes $E_1$, $E_2$, and $E_3$, respectively.

FIGS. 2 and 3 depict a unidirectional fiber-reinforced composite 200. Fiber-reinforced composites (e.g., 200) can have any width (e.g., measured along axis $E_2$) and any length (e.g., measured along axis $E_1$). For example, fiber-reinforced composites (e.g., 200) can have a width of up to 6 m or larger, or from 0.01 to 6 m, 0.5 to 5 m, or 1 to 4 m, or any range therebetween, and a length of up to 10,000 m or larger, or from 5 to 1,000 m, 10 to 100 m, or any range therebetween. The width of a composite (e.g., 200) can be 0.01, 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0 m, or larger. The length of a composite (e.g., 200) can be 1, 10, 100, 500, 1,000, 1,500, 2,000, 2,500, 3,000, 3,500, 4,000, 4,500, 5,000, 5,500, 6,000, 6,500, 7,000, 7,500, 8,000, 8,500, 9,000, 9,500, 10,000 meters, or larger.

3. Fibrous Region

Fiber-reinforced composite 200 includes a non-woven fibrous region 202 dispersed in a polymer matrix 204. Non-woven fibrous region 202 includes a plurality of fibers 206, which are unidirectionally oriented and substantially parallel to a first axis (e.g., axis $E_1$, FIG. 3). Fibers (e.g., 206) of a composite (e.g., 200) make up, by volume, 35 to 70%, preferably 40 to 65%, more preferably 45 to 55%, or any range therebetween, of the composite. Fibrous region 202 can be formed from a first flattened fiber layer and a second flattened fiber layer that have been pressed into a matrix material (e.g., as shown in and described with respect to FIG. 9). Fibers 206 can be glass fibers, carbon fibers, aramid fibers, polyethylene fibers, polyester fibers, polyamide fibers, ceramic fibers, basalt fibers, or steel fibers, or a combination thereof. Fibers 206 can have an average filament cross-sectional area of from 7 μm² to 800 μm², which, for circular fibers, equates to an average filament diameter of from 3 to 30 microns.

Fibers (e.g., 206) of a composite (e.g., 200) may be provided in bundles (e.g., bundles of carbon, ceramic, carbon precursor, ceramic precursor, glass, and/or the like fibers). Such bundles may include any number of fibers, such as, for example, 400, 750, 800, 1,375, 1,000, 1,500, 3,000, 6,000, 12,000, 24,000, 50,000, 60,000, or more fibers. Fibers in a bundle can have an average filament diameter of 5, 6, 7, 8, 9, 10, 11, 12, 13, 14, 15, 16, 17, 18, 19, 20, 21, 22, 23, 24, or more microns (e.g., from 5 to 24 microns, 10 to 20 microns, 12 to 15 microns, or any range therebetween). Fibers can be provided with a coating (e.g. a coating of an organic polymer, such as an organosilane), a pigment, and/or the like.

Glass fiber bundles (e.g., fiber glass yarn bundles) are commercially available from PPG Industries (Pittsburgh, Pa., USA) under the trade name HYBON®, Jushi Group Co., Ltd. (CHINA), and Kripa International (INDIA). Glass fiber bundles can have an average filament diameter of 10, 11, 12, 13, 14, 15, 16, 17, 18, 19, 20, 21, 22, 23, 24 microns, or larger (e.g., from 10 to 24 microns, 12 to 20 microns, 13 to 15 microns, or any range therebetween). Carbon fiber or modified carbon fiber bundles (e.g., carbon fiber tows) are commercially available from ACP Composites (Livermore, Calif., USA), Toray Industries, Inc. (JAPAN), and ZOLTEK (Bridgeton, MO, USA) under the trade name Panex®. Carbon fiber bundles can have an average filament diameter of from 3 to 8 microns, from 6 to 7 microns, or any range therebetween.

Aramid fiber bundles (e.g., aramid fiber yarn bundles) are sold by DuPont™ (Wilmington, Del., USA) under the trade name KEVLAR®. Ceramic fiber bundles (e.g., metal oxide fiber bundles) are commercially available from 3M (United States) under the trade name 3M™ Nextel™ Continuous Ceramic Oxide Fibers. Basalt fiber bundles are commercially available from Kamenny Vek (Moscow, RUSSIA) under the trade name Basfiber® or from Sudaglass Fiber Technology under the trade name Sudaglass (RUSSIA). Polyester fiber bundles, polyamide fiber bundles, polypheylene sulfide fiber bundles, and polypropylene fiber bundles are commercially available from Toray Industries under the trade name TORAYCAm. Without wishing to be bound by theory, it is believed that physical properties of fibers do not substantially change when the fibers are processed to form a fiber-reinforced composite using methods and apparatuses of the present disclosure.

A polymer matrix (e.g., 204) can comprise any suitable material, such as, for example, a thermoplastic polymer and/or a thermoset polymer. Non-limiting examples of such thermoplastic polymers include polyethylene terephthalate (PET), polycarbonates (PC), polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) or derivatives thereof, thermoplastic elastomers (TPE), terephthalic acid (TPA) elastomers, poly(cyclohexanedimethylene terephthalate) (PCT), polyethylene naphthalate (PEN), a polyamide (PA), polysulfone sulfonate (PSS), polyether ether ketone (PEEK), polyether ketone ketone (PEKK), acrylonitrile butyldiene styrene (ABS), polyphenylene sulfide (PPS), co-polymers thereof, or blends thereof. Non-limiting examples of such thermoset polymers include unsaturated polyester resins, polyurethanes, bakelite, duroplast, urea-formaldehyde, diallyl-phthalate, epoxy resin, epoxy vinylesters, polyimides, cyanate esters of polycyanurates, dicyclopentadiene, phenolics, benzoxazines, co-polymers thereof, or blends thereof.

Fibrous region 202 has a substantially uniform density as defined above. As shown, composite 200 has a volume fraction of voids that is less than 5%, such as, for example, less than 4, 3, 2, or 1%, from 0 to 5%, from 0.1 to 4%, or from 1 to 3%. Some fiber-reinforced composites, such as composite 200, can be substantially free of voids. In contrast, the prior art composites of FIG. 1 have fibrous regions that, while including consistent density portions 102, have inconsistent density portions 104 and voids 106.

4. Polymeric-Rich Regions

As shown, non-woven fibrous region 202 is positioned between a first polymeric-rich region 208 and a second polymeric-rich region 210. Polymeric-rich regions 208 and 210 include less than 10%, by volume, of fibers 206. Polymeric-rich regions (e.g., 208, 210, and/or the like) can comprise less than 9, 8, 7, 6, 5, 4, 3, 2, 1, 0.5, or 0.1%, by volume, of fibers (e.g., 206). The width and the length of each of first and second polymeric-rich regions, 208 and 210, are substantially similar to the width and the length, respectively, of fiber reinforced composite 200. For fiber-reinforced composite 200, a sum of the thickness of first polymeric-rich region 208 and the thickness of second polymeric-rich region 210 is from 15 to 25% of the thickness of the composite. First and second polymeric-rich regions, 208 and 210, have substantially the same thickness (e.g., the thicknesses are within 10% of each other); however, in other embodiments, polymeric-rich regions (e.g., 208 and 210) may have differing thicknesses (e.g., thicknesses that vary by more than 10, 11, 12, 13, 14, 15, 16, 17, 18, 19, 20, or more % with respect to each other). Each of first and second polymeric-rich regions, 208 and 210, can have a substantially uniform density throughout the polymeric-rich region. Such polymer-rich regions (e.g., 208 and 210) may enhance composite (e.g., 200) strength by providing sufficient polymeric matrix (e.g., 204) to hold fibers (e.g., 206) in position, as well as facilitate handling of the composite (e.g., by overlying and containing fibers within the composite) and bonding of the composite to other composites or structures.

5. Fiber-Reinforced Composites Made from Plies

Figure 4A:
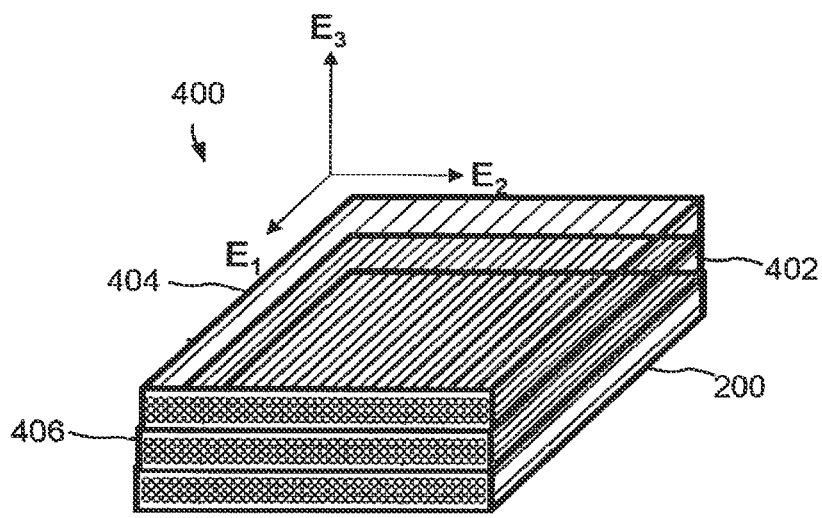
FIG. 4A is a schematic of a stack or lay-up of three unidirectional fiber-reinforced composites, with fibers of the three composites being substantially parallel to each other.
Figure 4B:
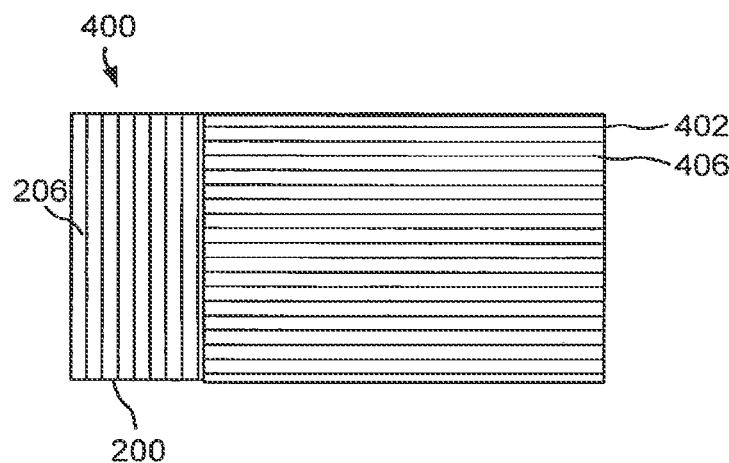
FIG. 4B is a cut-away schematic of a stack or lay-up of two unidirectional fiber-reinforced composites, with fibers of the two composites being oriented in differing directions.
Figure 4C:
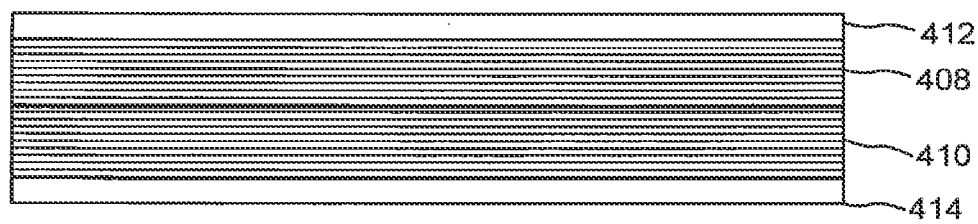
FIG. 4C is a schematic of a stack or lay-up of unidirectional fiber-reinforced composites, including a protective coating.

FIGS. 4A-4C are schematics of stacks or lay-ups of fiber-reinforced composites of the present invention, which may be used to form laminates. Such stacks or lay-ups can include two or more (e.g., 2, 3, 4, 5, 6, 7, 8, 9, 10, or more) fiber-reinforced composites (e.g., 200), and such fiber-reinforced composites can be oriented relative to one another within the stack or lay-up in any suitable fashion. For example, stack 400 of FIG. 4A includes three UD fiber-reinforced composites, 200, 402, and 404. As shown, fibers 406 of each UD composite 200, 402, and 404 are substantially parallel to one another and with axis $E_1$ (e.g., stack 400 may be characterized as a UD stack). For further example, stack 400 of FIG. 4B includes two UD fiber-reinforced composites, 200 and 402. As shown, fibers 206 of UD composite 200 are angularly disposed (e.g., at 90 degrees) relative to fibers 406 of UD composite 402. Composites, plies, stacks, and laminates may be provided with protective coating(s). For example, FIG. 4C depicts a stack of two UD fiber-reinforced composites, 408 and 410, having protective coatings or layers 412 and 414. Lay-ups or stacks having non-fibrous or non-UD layer(s), plie(s), or film(s) are also contemplated. Examples of such layer(s), plie(s), or film(s) include neat thermoplastic resin, compounded thermoplastic polymer with various additives, and/or the like.

6. Additives

The disclosed polymeric compositions and matrices can further comprise one or more optional additive components, including for example, one or more additives selected from the group consisting of: a coupling agent to promote adhesion between a matrix material and fibers, an antioxidant, a heat stabilizer, a flow modifier, a flame retardant, a LV stabilizer, a UV absorber, an impact modifier, a cross-linking agent, a colorant, or a combination thereof. Non-limiting examples of coupling agents suitable for use as an additive component in the disclosed compositions include Polybond® 3150 maleic anhydride grafted polypropylene, commercially available from Chemtura, Fusabond® P613 maleic anhydride grafted polypropylene, commercially available from DuPont, maleic anhydride ethylene, or combinations thereof. An exemplary flow modifier suitable for use as an additive component in the disclosed compositions can include, without limitation, CR20P peroxide masterbatch, commercially available from Polyvel Inc. A non-limiting exemplary stabilizer suitable for use as an additive component in the disclosed compositions can include, without limitation, Irganox® B225, commercially available from BASF. In a still further aspect, neat polypropylene can be introduced as an optional additive. Non-limiting examples of flame retardants include halogen and non-halogen-based polymer modifications and additives. Non-limiting examples of UV stabilizers include hindered amine light stabilizers, hydroxybenzophenones, hydroxyphenyl benzotriazoles, cyanoacrylates, oxanilides, hydroxyphenyl triazines, and combinations thereof. Non-limiting examples of UV absorbers include 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, or combinations thereof. Non-limiting examples of impact modifiers include elastomers/softblocks dissolved in matrix-forming monomer(s), such as, for example, bulk HIPS, bulk ABS, reactor modified PP, Lomod, Lexan EXL, and/or the like, thermoplastic elastomers dispersed in matrix material by compounding, such as, for example, di-, tri-, and multiblock copolymers, (functionalized) olefin (co)polymers, and/or the like, pre-defined core-shell (substrate-graft) particles distributed in matrix material by compounding, such as, for example, MBS, ABS-HRG, AA, ASA-XTW, SWIM, and/or the like, or combinations thereof. Non-limiting examples of cross-linking agents include divinylbenzene, benzoyl peroxide, alkylenediol di(meth)acrylates, such as, for example, glycol bisacrylate and/or the like, alkylenetriol tri(meth) acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, or combinations thereof.

B. Systems, Methods, and Apparatuses for Making Fiber-Reinforced Composites

Figure 5:
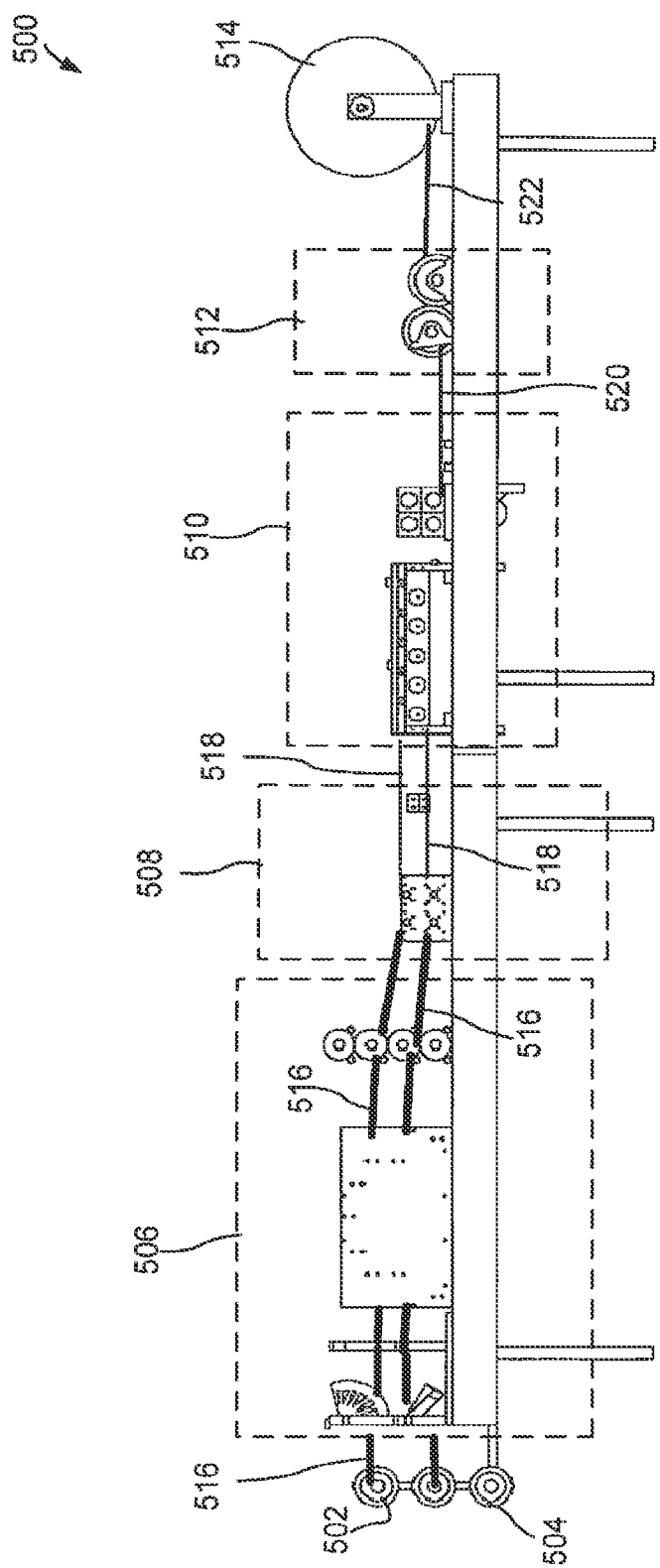
FIG. 5 is a schematic of a system for making unidirectional fiber-reinforced composites of the present disclosure.

FIG. 5 is a schematic of a system 500 for making fiber-reinforced composite 200 of the present disclosure. System 500 can include spools of fiber bundles 502, an unwinding unit 504, a fiber preparation section 506, a spreading section 508, an impregnation section 510, a shaping unit 512, and a winder 514. Spools of fiber bundles 502 can be positioned on unwinding unit 504, which can unwind fiber bundles 516 from the spools such that the fiber bundles can be provided to fiber preparation section 506. In some instances, a wound fiber bundle may be provided (e.g., from a supplier) without a spool; in such instances, a spool may be inserted into the wound fiber bundle before positioning the wound fiber bundle on unwinding unit 504. Fiber bundles 516 may be fiber bundles that have not been subjected to any fiber spreading operation. Fiber preparation section 506 can include units known in the art to prepare fiber bundles 516 for spreading. For example, fiber preparation section 506 may include one or more tensioners (e.g., a dancer tension control system, one or more rollers, and/or the like) for tensioning, stabilizing, and, in some instances, guiding fiber bundles 516. Such tensioner(s) may provide tension to fiber bundles 516 during contact with spreading elements 604A-604D, which may help maintain the fiber bundles in position during spreading or flattening of the fiber bundles. In some instances, unwinding unit 504 may be spaced from fiber preparation section 506 and/or spreading section 508 (e.g., by 1, 2, 3, 4, 5, 6, 7, 8, 9, 10, or more in), such that, for example, a weight of fiber bundles 516 serves to tension the fiber bundles. For further example, fiber preparation section 506 may be configured to heat fiber bundles 516 and/or spray the fiber bundles (e.g., to remove any coating that may be present on the fiber bundles).

In spreading section 508, fiber bundles 516 can be spread or flattened into spreaded fiber layers 518 (as described in more detail below). Spreaded fiber layers 518 may be provided to impregnation section 510, where the fiber layers can be dispersed into a matrix material to form a fiber-reinforced composite 520 (e.g., fiber-reinforced composite 200 in FIG. 2). Impregnation section 510 can include an extruder, a bath, a coating system, and/or the like. Fiber-reinforced composite 520 can enter shaping unit 512, where the fiber-reinforced composite may be formed into a tape 522 or sheet. Tape 522 may be provided to winder 514, which may wind the tape around a spool (e.g., to facilitate storage, transportation, and/or the like of the tape).

1. Spreading Section

Spreading section 508 may include one or more spreading units 600, each configured to spread one or more fiber bundles 516 into one or more spreaded fiber layers 518. Spreading section 508 may also include one or more rollers, motors, electrical connections, and/or the like needed to operate spreading unit 600.

i. Spreading Unit

Referring to FIGS. 6A through 6G, spreading unit 600 is depicted. As will be described in more detail below, spreading unit 600 can include various components, such as, for example, one or more holding elements (e.g., 602A-602D), one or more spreading elements (e.g., 604A-604D), one or more heat sources (e.g., such as heated spreading element (s)), and, optionally, one or more rollers (e.g., 606). Components of spreading unit 600 can be made of materials that are resistant to corrosion and/or to materials used in making fiber layers or fiber-reinforced composites (e.g, fibers, matrix materials, and/or the like), such as, for example, stainless steel, other alloys, and/or the like. Components of spreading unit 600 can be coupled to a frame 608. One or more components of spreading unit 600 can be removably coupled to frame 608, to, for example, facilitate maintenance and/or reconfiguration of the spreading unit (e.g., via replacing spreading elements with other spreading elements having differing lobes, replacing holding elements with other holding elements having differing fiber holding sections, radii, and/or the like, and/or the like). Frame 608 can include wheels or other features to enhance portability of spreading unit 600.

ii. Holding Elements

Figure 6A:
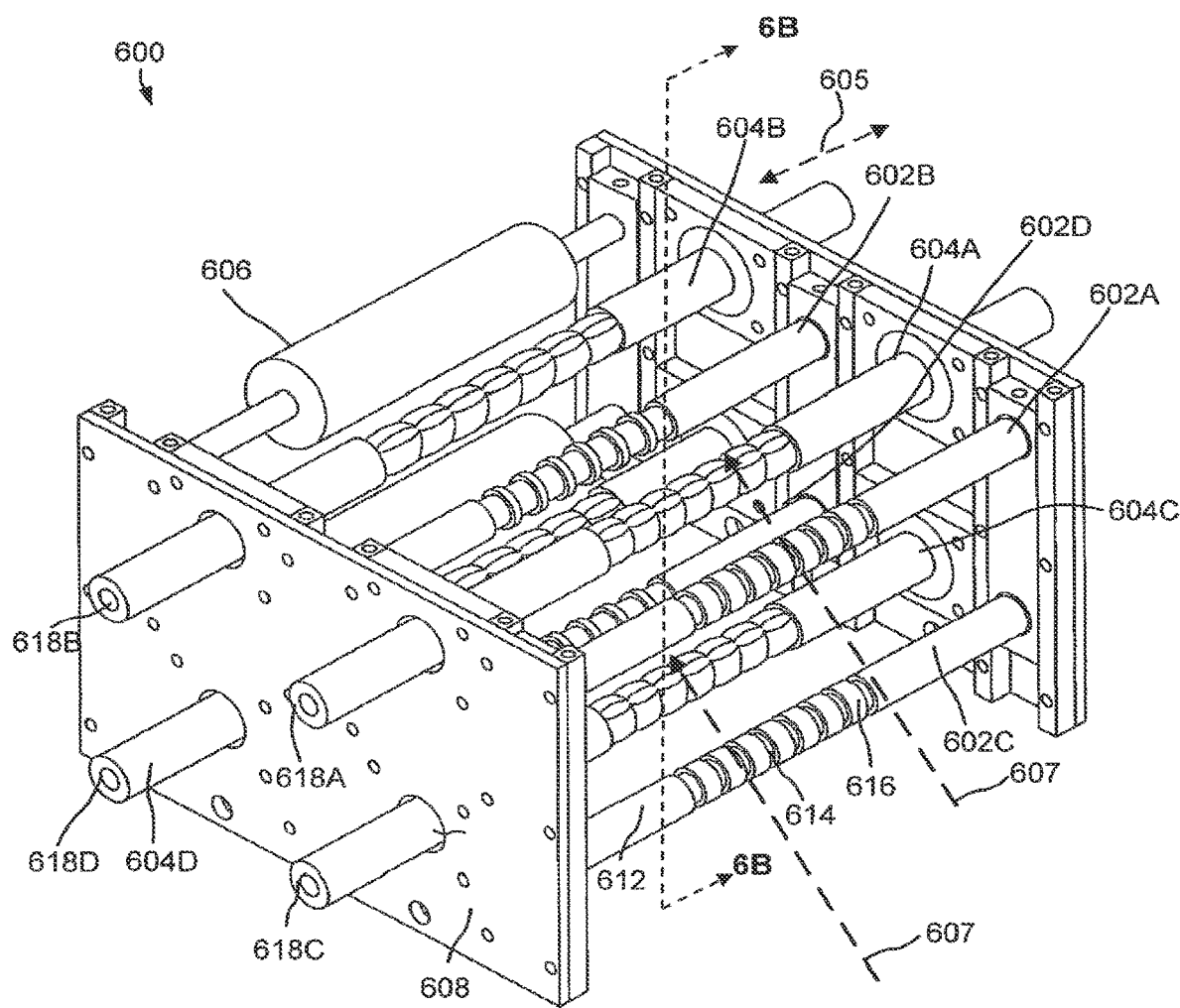
FIG. 6A is a perspective view of a spreading unit of the present disclosure.
Figure 6B:
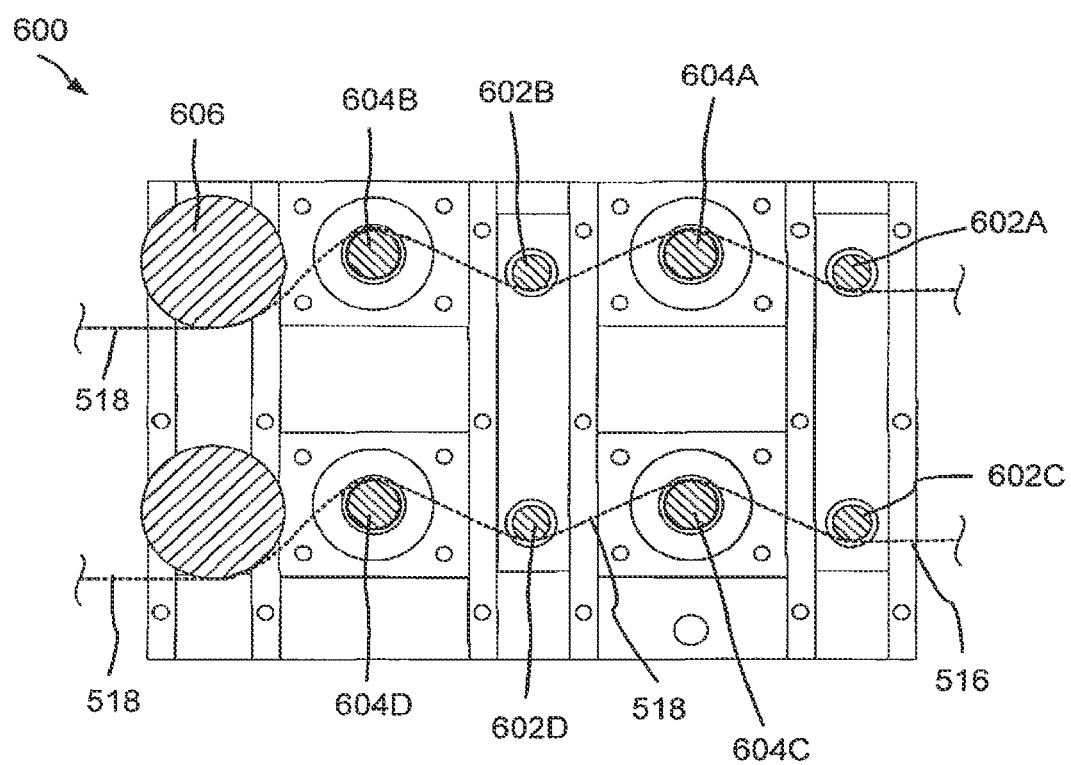
FIG. 6B is a cross-sectional side view of the spreading unit of FIG. 6A, taken along line 6B-6B of FIG. 6A.
Figure 6C:
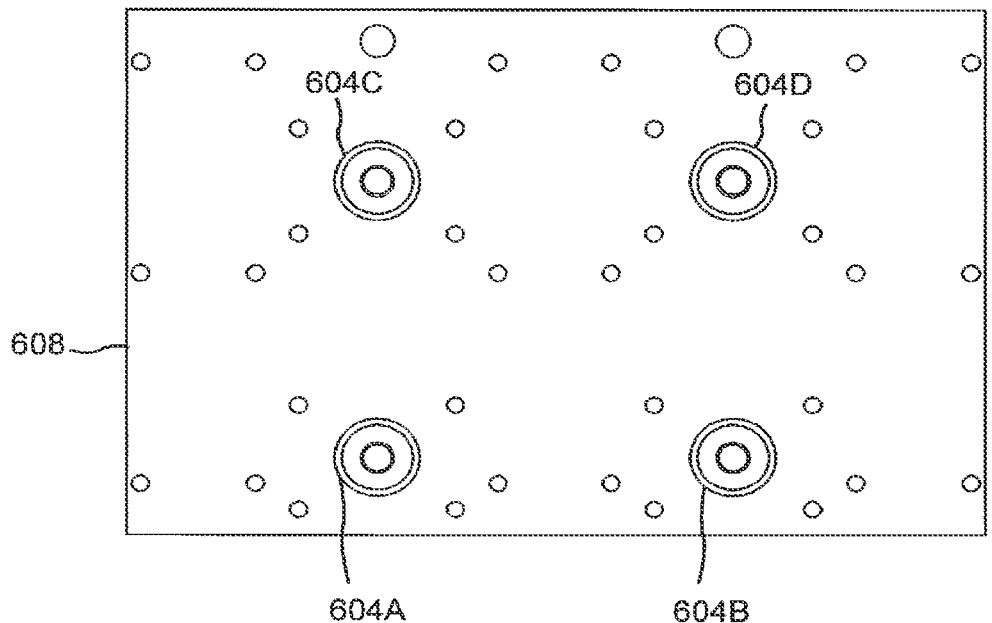
FIGS. 6C-6G are side, top, bottom, front, and back views, respectively, of the spreading unit of FIG. 6A.
Figure 6D:
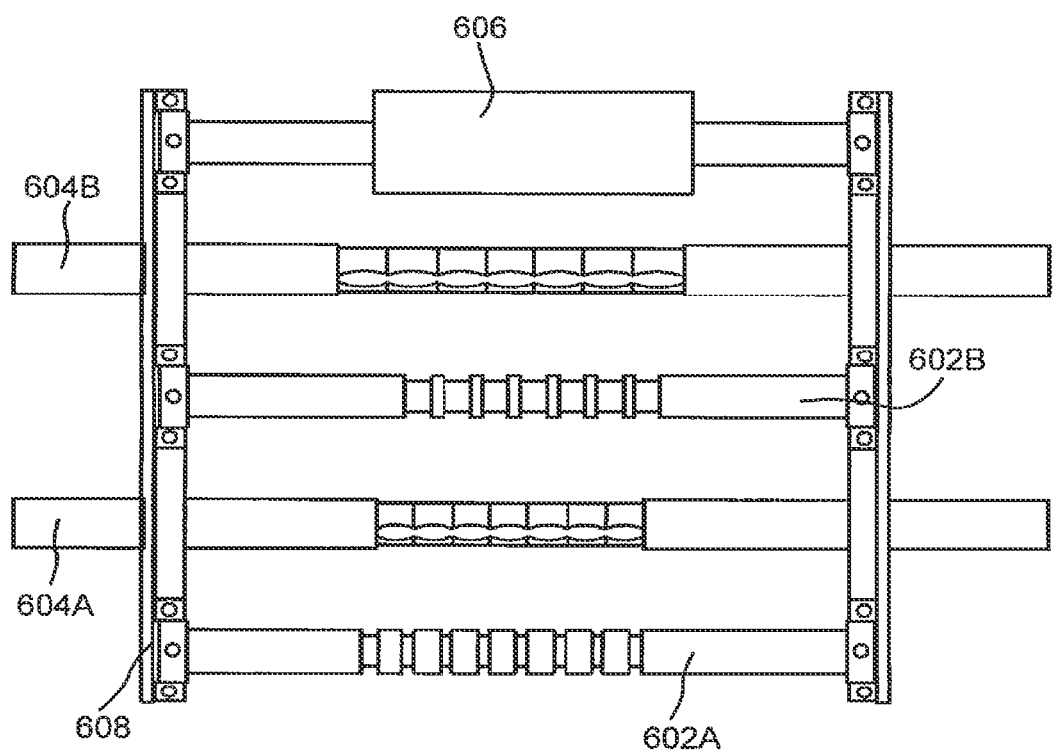
Figure 6E:
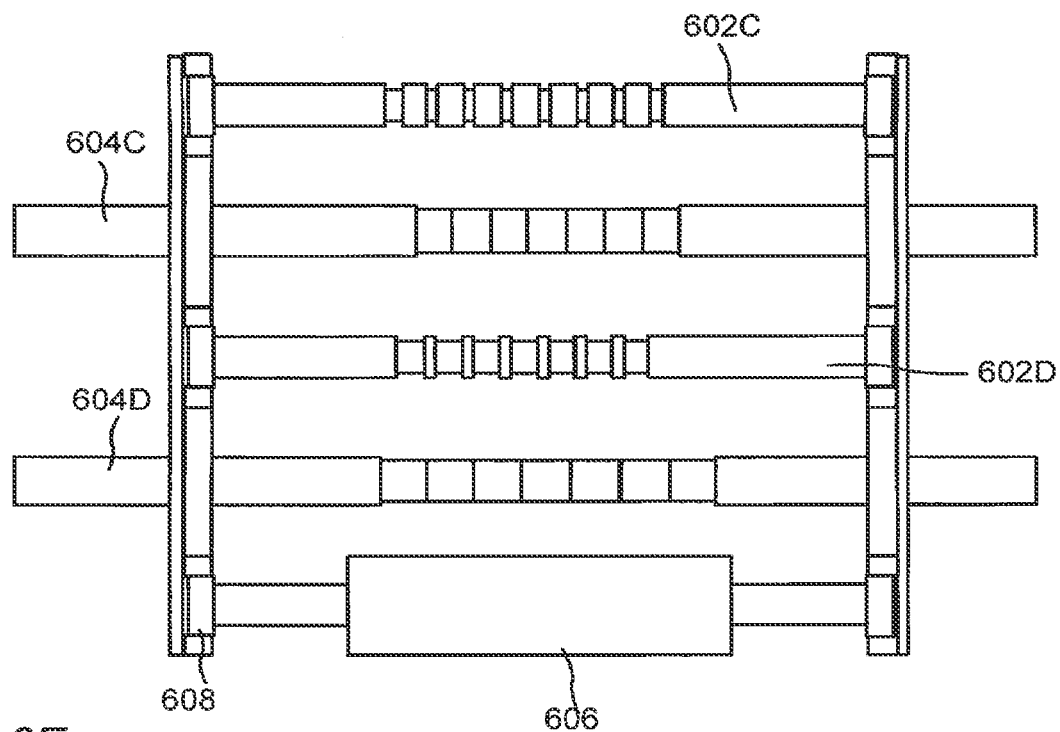
Figure 6F:
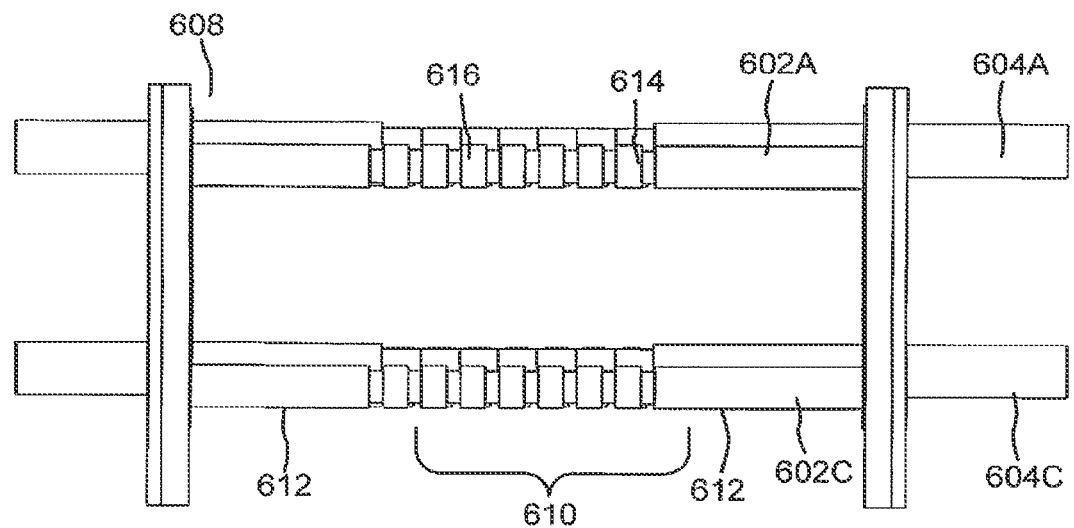
Figure 6G:
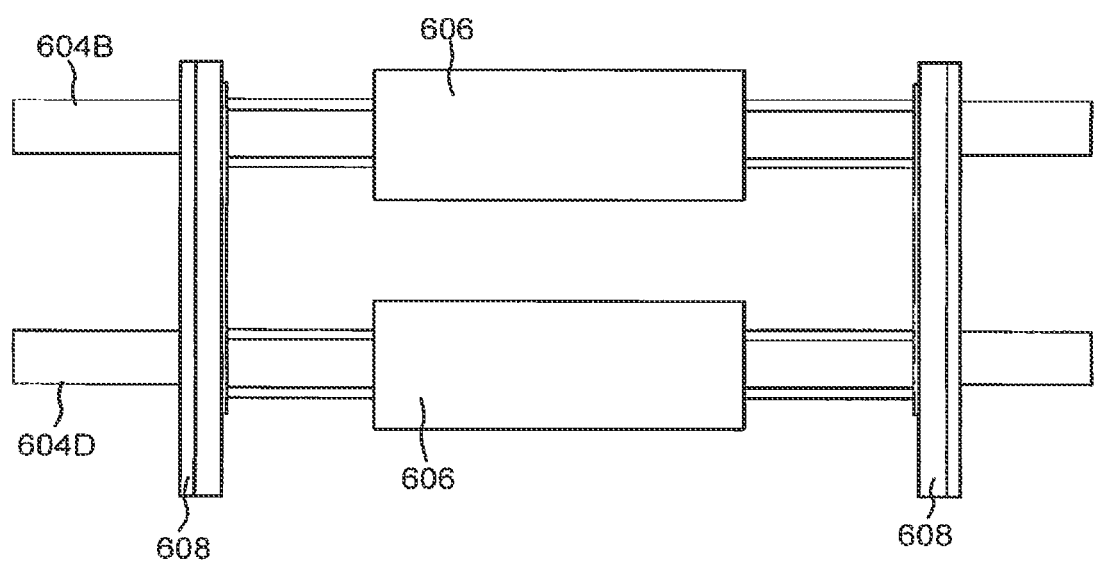
Figures 7A, 7B, 7C:
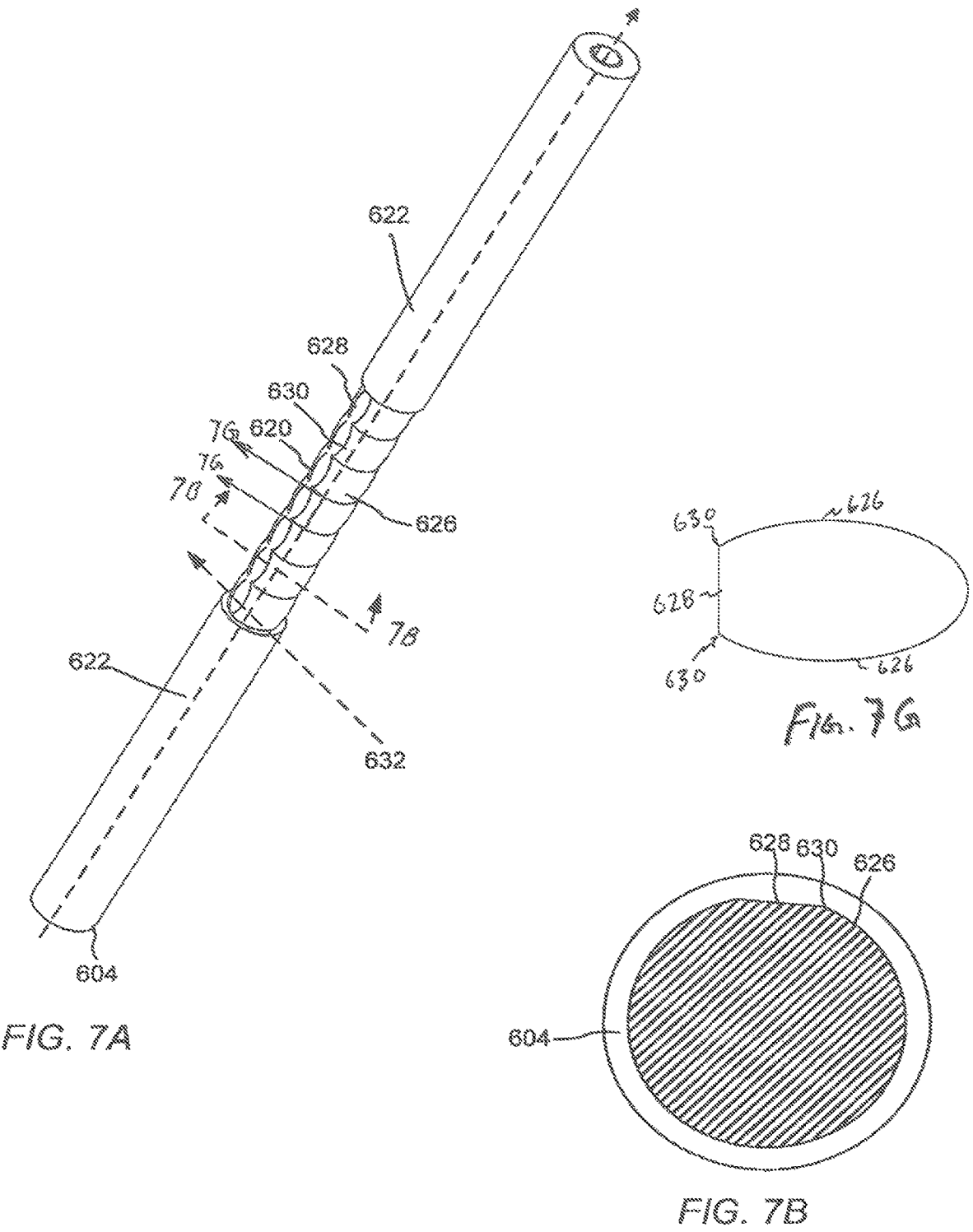
FIG. 7A is a perspective view of a spreading element of the present disclosure.
FIG. 7B is a cross-sectional end view of the spreading element of FIG. 7A, taken along line 7B-7B of FIG. 7A.
FIGS. 7C-7F are front, top, bottom, and perspective views, respectively, of the spreading element of FIG. 7A.
Figure 7C:
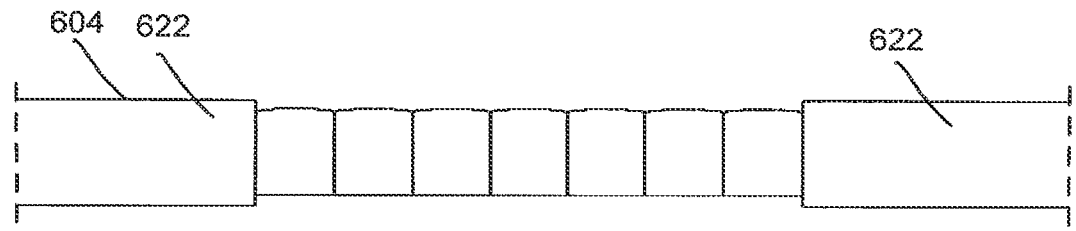
Figure 7D:
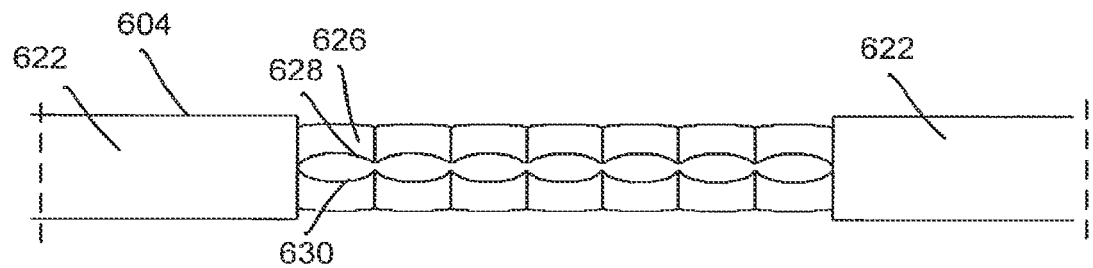
Figure 7E:
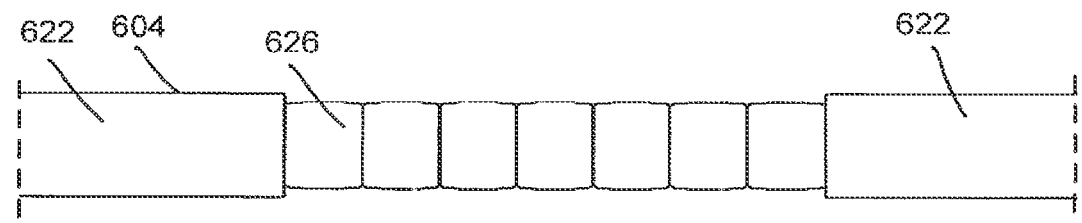
Figure 7F:
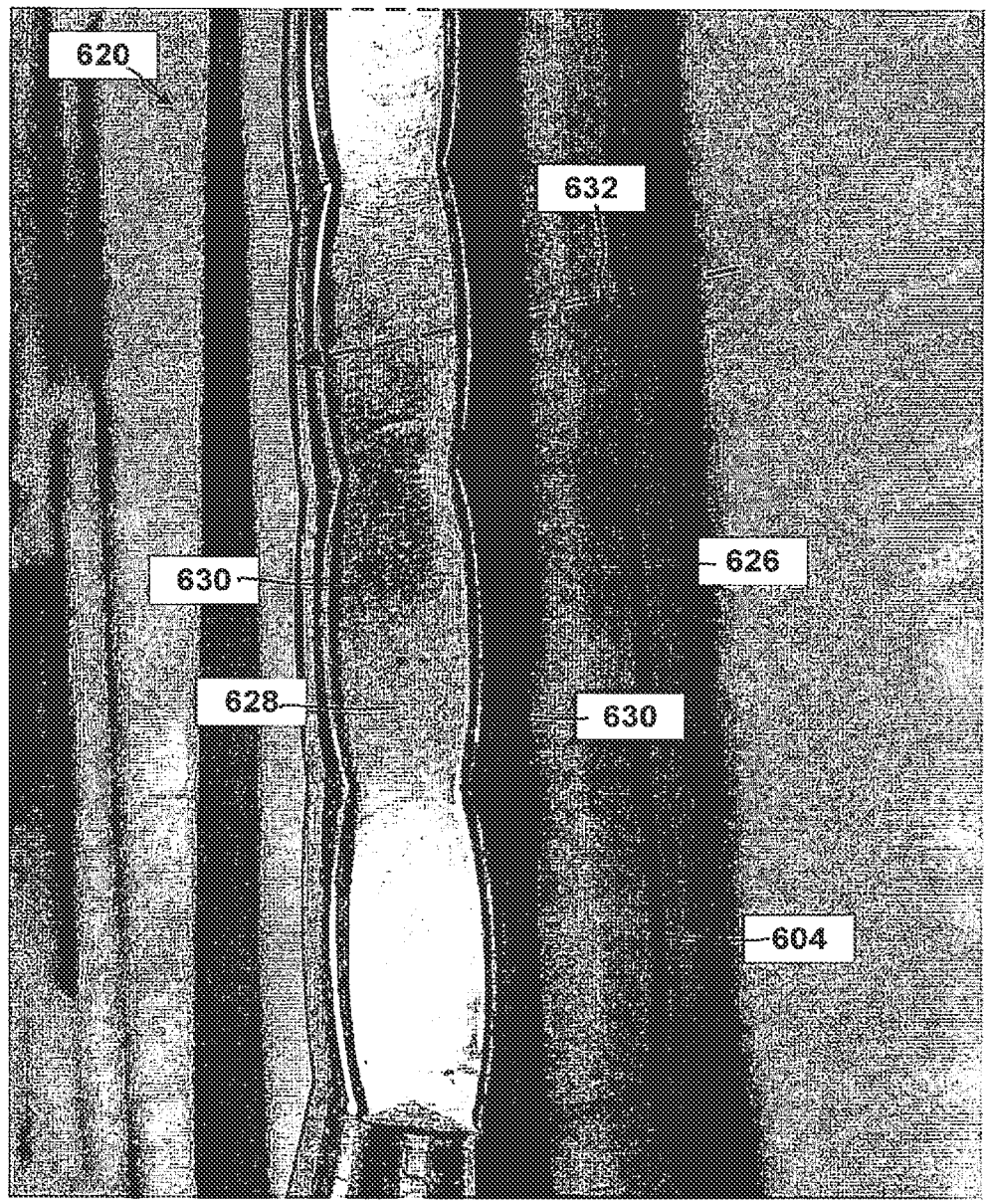

Holding elements 602A-602D each include a fiber holding section 610 disposed between holding element end sections 612 (FIG. 6F). For each holding element, fiber holding section 610 may be characterized as including a plurality of grooves 614 or a plurality of projections 616. As shown, each fiber holding section 610 includes seven (7) grooves 614; however, in other embodiments, a fiber holding section (e g, 610) may include any number of grooves (e.g., 614), and the number of grooves may be selected based on a number of fiber bundles (e.g., 516) to be spread by a spreading unit (e.g., 600), a number of spreaded fiber layers (e.g., 518) to be produced by the spreading unit, and/or the like. Grooves 614 of a fiber holding section 610 may each have dimensions (e.g., width and depth) that are the same as, substantially similar to, or different than one another. Holding elements 602A-602D each comprise a bar (e.g., the holding elements are rod-shaped); however, in other embodiments, a holding element (e.g., 602A-602D) may comprise a plate.

Holding elements 602A-602D may each be configured to reduce undesired lateral movement of a plurality of fibers (e.g., in a fiber bundle 516 or a spreaded fiber layer 518) as the plurality of fibers enters the spreading unit, passes over spreading element(s), exits the spreading unit, and/or the like. For example, for a fiber holding section 610, grooves 614 may each have a width (e.g., measured along a longitudinal axis of the respective holding element) that corresponds to a width of a plurality of fibers that the fiber holding section is configured to receive. Grooves 614 of holding elements 602A and 602C, which are configured to receive fiber bundles 516, may each have a smaller width than a width of grooves 614 of holding elements 602B and 602D, which are configured to receive spreaded fibers from spreading elements 604A and 604C. More particularly, grooves 614 of holding elements 602A and 602C can each have a width of 4 to 8 mm, preferably about 6 mm, and grooves 614 of holding elements 602B and 602D can each have a width of 8 to 12 mm, preferably about 10 mm.

Spreading unit 600 includes four (4) holding elements 602A-602D and four (4) spreading elements 604A-604D. Each spreading element can be paired with a holding element and, for each pair, the holding element can be positioned upstream of the spreading element.

iii. Spreading Elements

Referring additionally to FIGS. 7A-7F, shown is a spreading element 604, which may be representative of spreading elements 604A-604D. Spreading element 604 is configured to spread a plurality of fibers into a spreaded fiber layer 518 (e.g., whether spreading fibers in a fiber bundle 516 or further spreading fibers in a spreaded fiber layer 518). Spreading element 604 includes a profile taken perpendicularly to a longitudinal axis of the spreading element, a first surface 626 that defines a convex portion of the profile, and a second surface 628 that defines a straight or concave portion of the profile. First surface 626 can be ellipsoidal and/or second surface 628 can be planar or concave. First surface 626 and second surface 628 can meet at an edge 630, which may be rounded (e.g., the edge may be filleted) to mitigate snagging or tearing of fibers as they pass over the edge. In these ways and others, as a plurality of fibers passes over spreading element 604 (e.g., approaching the spreading element in a direction indicated by arrow 632), the fibers may transition from first surface 626 to second surface 628 (e.g., across edge 630, if present), thereby spreading the fibers. Spreading element 604 is generally straight, for example, the longitudinal axis of the spreading element extends through spreading element end sections 622 as well as a portion of the spreading element that is halfway between the longitudinal end sections. Spreading element 604 comprises a bar (e.g., is rod-shaped); however, in other embodiments, a spreading element (e.g., 604A-604D) may comprise a plate.

Spreading element 604 includes two or more lobes 620 disposed along the longitudinal axis of the spreading element. Each lobe 620 can include a first surface 626 and a second surface 628 (e.g., as described above). Lobes 620 can be disposed along the longitudinal axis of the spreading element such that second surfaces 628 of the two or more lobes are contiguous. As shown, spreading element 604 includes 7 lobes; however, in other embodiments, a spreading element (e.g., 604) can include any suitable number of lobes (e.g., 620), such as, for example, from 1 to 100, 2 to 50, 3 to 25, 5 to 20 lobes, with 5, 6, 7, 8, 9, or 10 lobes being preferred.

Spreading elements 604A-604D can each be movable relative to a plurality of fibers being spread by spreading unit 600 in a direction that is substantially perpendicular to a long dimension of the fibers (e.g., generally in a direction indicated by arrow 605), which may enhance spreading of the fibers. For example, each of spreading elements 604A-604D may be coupled to frame 608 such that the spreading element is movable relative to the frame in a direction that is substantially aligned with the longitudinal axis of the spreading element. In some embodiments, an entire spreading unit (e.g., 600), including a frame (e.g., 608) and spreading elements (e.g., 604A-604D), may be configured to move relative to a plurality of fibers being spread by the spreading unit.

More particularly, spreading elements 604A-604D may be configured to oscillate relative to a plurality of fibers being spread by spreading unit 600. Such oscillation can be at any suitable amplitude, such as, for example, of from 0.1 to 20 mm, 0.1 to 10 mm, 0.5 to 8 mm, 1 to 5 mm, or 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 11, 12, 13, 14, 15, 16, 17, 18, 19, or 20 mm. Such oscillation can be at any suitable frequency, such as, for example, of from 0.1 to 5 Hz, 0.5 to 2 Hz, or 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.5, 3.0, 3.5, 4.0, 4.5, or 5.0 Hz. Such oscillation of spreading elements 604A-604D may assist in juxtaposing a plurality of fibers as the fibers pass over the spreading elements. Each of spreading elements 604A-604D can be oscillated at a same or different amplitude and/or frequency.

Spreading elements 604A-604D can each be rotatable about the longitudinal axis of the spreading element and relative to a plurality of fibers being spread by spreading unit 600. For example, spreading elements 604A-604D are each coupled to frame 608 such that the spreading element is rotatable relative to the frame about the longitudinal axis of the spreading element. Through such rotation of a spreading element, the location where a plurality of fibers makes contact with the spreading element (e.g., along first surface 626 or second surface 628 or at edge 630) can be adjusted to provide for optimum spreading of the fibers. In some embodiments, such rotation of a spreading element may be cyclical or oscillating.

Movement (e.g., translation and/or rotation) of spreading elements (e.g., 604A-604D) can be accomplished in any suitable fashion. For example, spreading element ends 622 of each spreading element 604A-604D include coupling elements, 618A-618D, respectively, each configured to be coupled to a motor or drive (not shown).

Figure 8A:
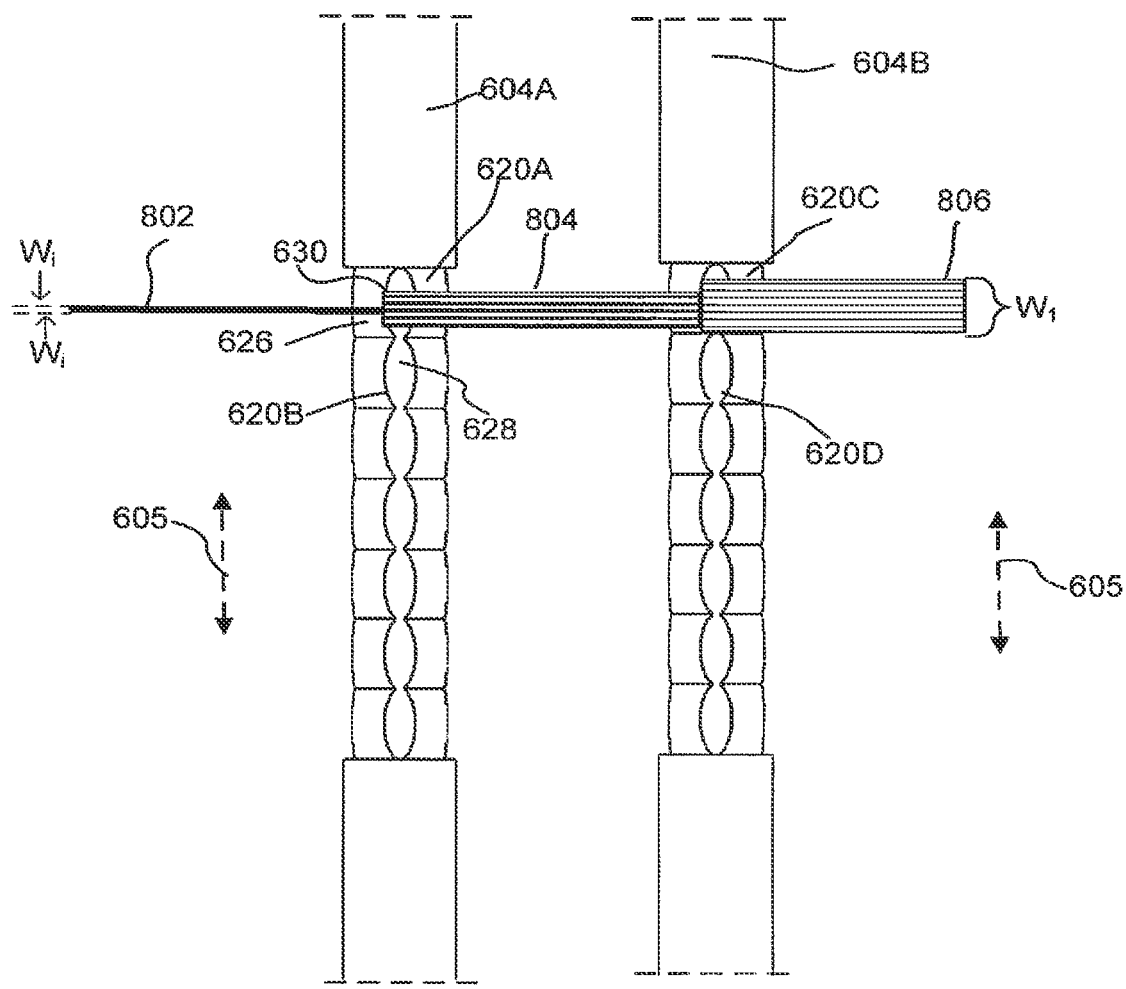
FIGS. 8A-8C are schematics of fiber bundle(s) being spread using spreading elements of the present disclosure.
Figure 8B:
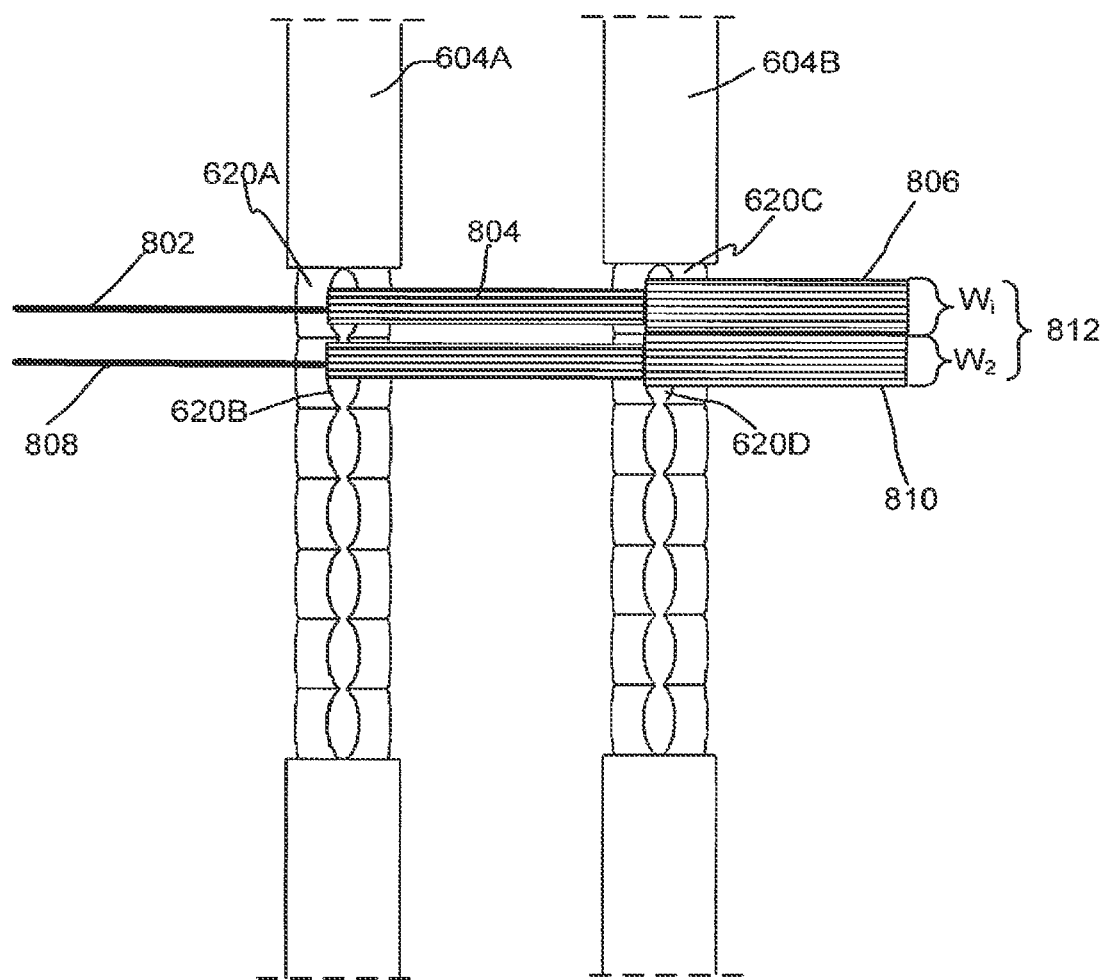

Referring additionally to FIG. 8A, methods for producing a spreaded fiber layer are shown. A fiber bundle 802 having an initial width ($W_i$) may enter spreading unit 600 and, in some instances, pass over a holding element (e.g., 602A-602D). Fiber bundle 802 may make contact with spreading element 604A (e.g., travelling in a direction indicated by arrow 607), which may be oscillating, at first surface 626 and transition to second surface 628 (e.g., across edge 630), thereby being spread into a spreaded fiber layer 804. Spreaded fiber layer 804 can, in some instances after passing over a holding element (e.g., 602A-602D), make contact with spreading element 604B, which may be oscillating, at first surface 626 and transition to second surface 628 (e.g., across edge 630), thereby being spread into a spreaded fiber layer 806, having a width ($W_1$) that is larger than the initial width of fiber bundle 802.

Figure 8C:
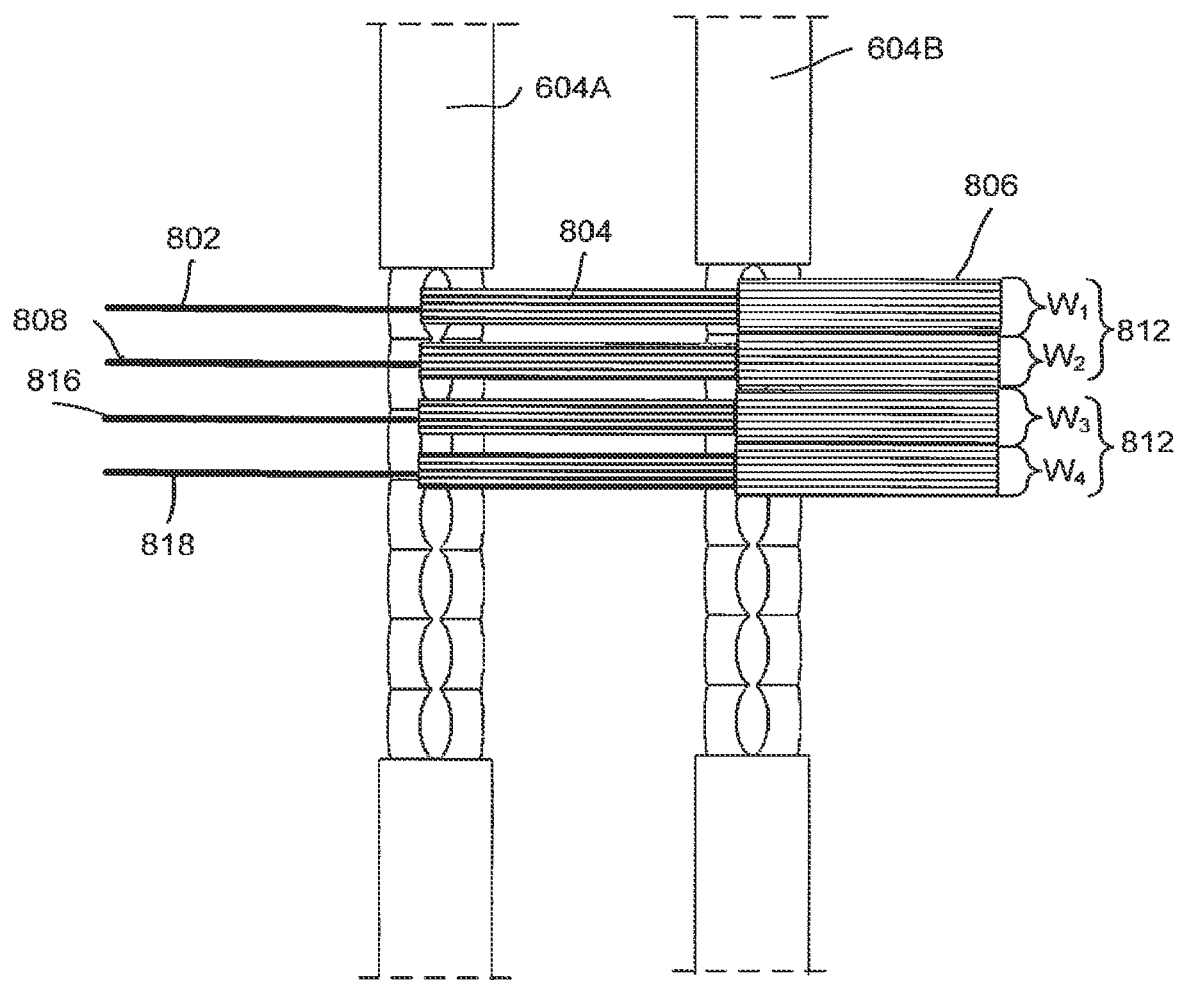
Figure 8D:
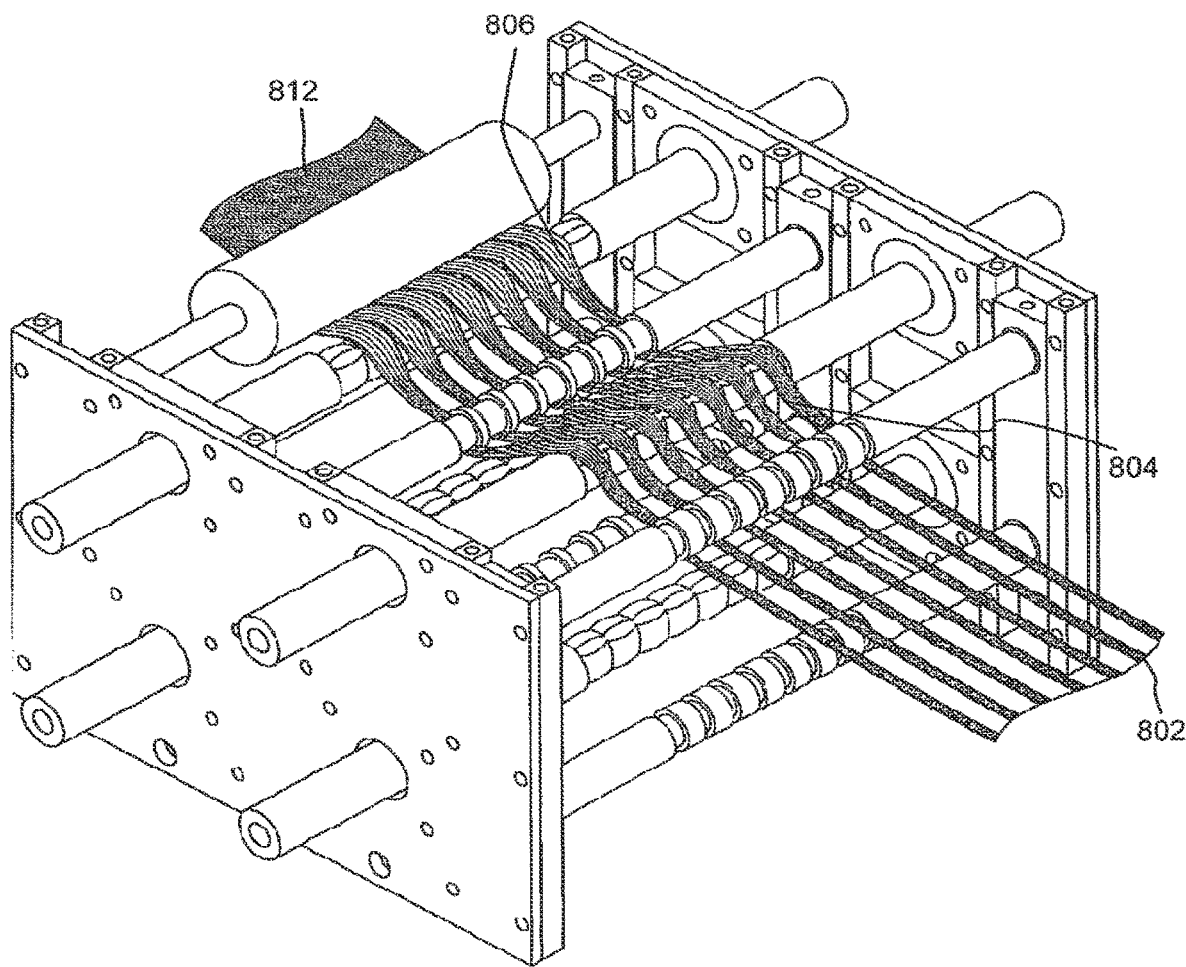
FIGS. 8D and 8E are perspective views of fiber bundles being spread using a spreading unit of the present disclosure.
Figure 8E:
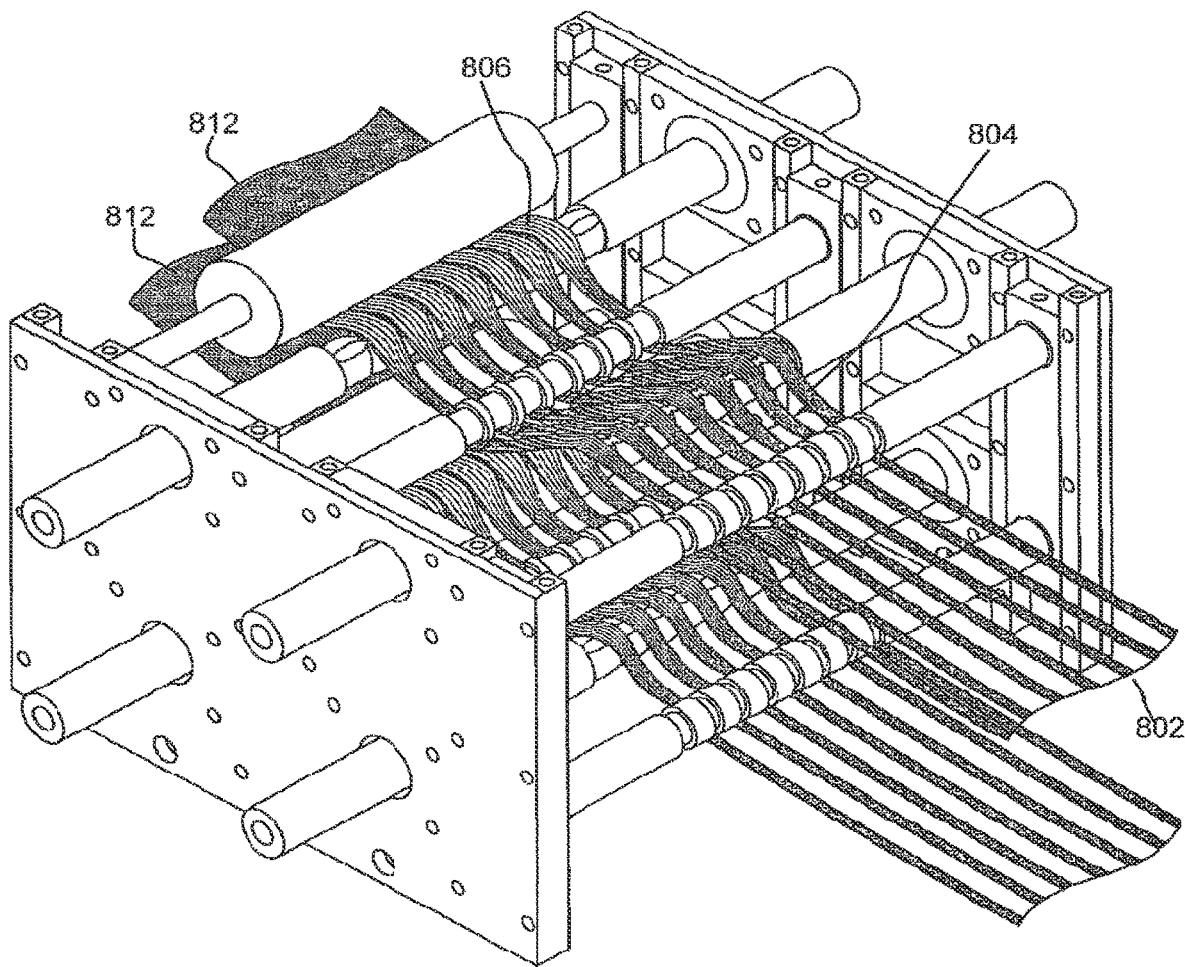

While not shown, a (e.g., major and/or minor) radius of first surface 626 of spreading element 604B (e.g., of lobe 620C) can be larger than a corresponding radius of first surface 626 of spreading element 604A (e.g., of lobe 620A). Such a configuration may facilitate spreading element 604B in further spreading spreaded fiber layer 804 from spreading element 604A. A radius of first surface 626 of spreading element 604B can be 1, 2, 3, 4, 5, 6, 7, 8, 9, 10, or more % larger than a corresponding radius of first surface 626 of spreading element 604A. In some embodiments, a first surface (e.g., 626) of a first spreading element (e.g., 604A) can have a radius of from 10 to 50 mm, 20 to 40 mm, 25 to 35 mm, or about 30 mm and a first surface (e.g., 626) of a second spreading element (e.g., 604B) that is downstream of the first spreading element can have a radius of from 50 to 100 mm, 50 to 90 mm, 55 to 65 mm, or about 60 mm In some embodiments, more than one fiber bundle (e.g, 516) can be used to make a single spreaded fiber layer (e.g., 518). For example, and referring additionally to FIGS. 8B-8E, fiber bundles 802 and 808 may be spread by spreading unit 600 into spreaded fiber layers 806 and 810, respectively (e.g., in a same or similar fashion as described above for fiber bundle 802). As shown, spreading elements 604A and 604B, and more particularly lobes 620A-620D thereof, may be positioned relative to one another such that spreaded fiber layers 806 and 810 form a single spreaded fiber layer 812. Spreaded fiber layer 812 can have a width that is equal to or greater than a sum of the width of spreaded fiber layer 806 and a width ($W_2$) of spreaded fiber layer 810. Similarly, a spreaded fiber layer 812 can be formed from fiber bundles 816 and 818 (FIG. 8C). In some instances, spreaded fiber layer 812 from fiber bundles 802 and 808 may be combined with spreaded fiber layer 812 from fiber bundles 816 and 818 to form a spreaded fiber layer 812 having fibers from fiber bundles 802, 808, 816, and 818.

Such spreaded fiber layers (e.g., 806, 810, 812, and/or the like) may be produced at any suitable rate, such as, for example, of from 1 to 50 m/min, 2 to 25 m/min, or 8 to 15 m/min. Spreaded fiber layers (e.g., 806, 810, 812, and/or the like) from spreading section 508 may be provided to impregnation section 510 to be dispersed into a matrix material.

2. Impregnation Section

Impregnation section 510 may include an extruder 906, one or more pressing elements (e.g., 908, 914, 918, 922, 923, and/or the like), one or more rubbing elements (e.g., 916, 920, 924, and/or the like), one or more heat source(s) (e.g., 915, heated pressing element(s), heated rubbing element(s), and/or the like), and/or the like. Impregnation section 510 may also include one or more rollers, motors, electrical connections, and/or the like needed to operate the impregnation section. At least some components of impregnation section 510 may be referred to collectively as an impregnation unit, even though such components may not be physically attached to one another.

Figure 9:
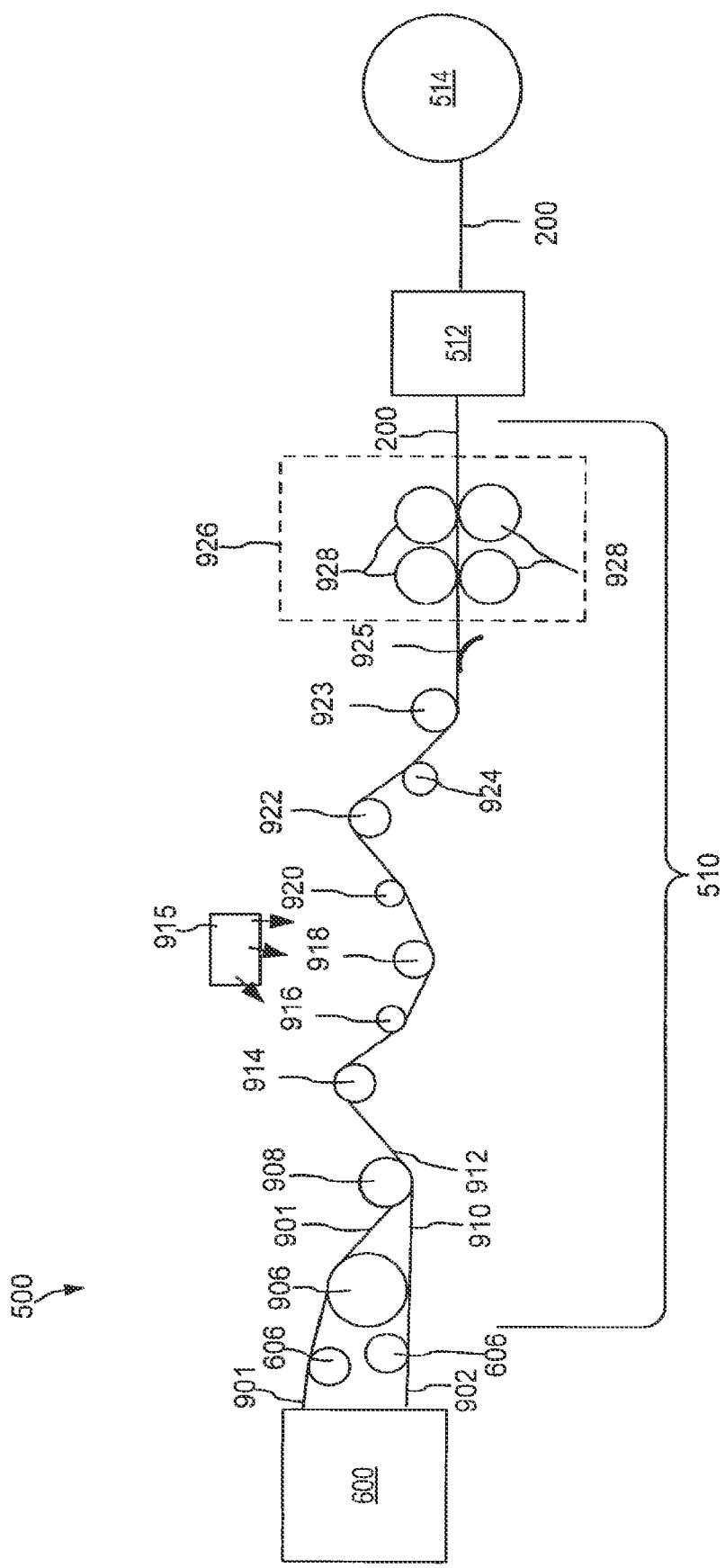
FIG. 9 is a schematic depicting one embodiment for processing spreaded fiber layer(s) to form a unidirectional fiber-reinforced composite.

Referring to FIG. 9, spreaded fiber layer(s) from spreading section 508 may be guided to impregnation section 510 by one or more rollers 606 (e.g., which, if present, may be considered a component of the spreading section and/or a component of the impregnation section) wherein the spreaded fiber layer(s) may be dispersed within a matrix material. For example, impregnation section 510 comprises an extruder 906 configured to supply a sheet or film of matrix material to the spreaded fiber layer(s); however, in other embodiments, a matrix material may be provided to spreaded fiber layer(s) using any suitable structure.

Impregnation section 510 includes one or more pressing elements (e.g., 908, 914, 918, 922, 923, and/or the like), each disposed downstream of extruder 906 and configured to press at least one of the spreaded fiber layer(s) into the matrix material. For example, each pressing element can include a convex surface configured to press at least one of the spreaded fiber layer(s) into the matrix material as the spreaded fiber layer, when in contact with the matrix material, is passed under tension over the convex surface. A pressure applied by a pressing element to the spreaded fiber layer(s) can be varied by adjusting an angle at which the spreaded fiber layer(s) approach or leave the pressing element, a tension of the spreaded fiber layer(s), and/or the like. Pressing elements (e.g., 908, 914, 918, 922, 923, and/or the like) may be heated, in some instances, to differing temperatures. In these ways and others, such pressing elements may provide sufficient pressure and/or temperature to press the one or more spreaded fiber layers into the matrix material. In some instances, a heat source 915, such as, for example, an infrared heat source, may be provided to facilitate the pressing process (e.g., by heating the matrix material and/or spreaded fiber layer(s)). Pressing elements (e.g., 908, 914, 918, 922, 923, and/or the like) may comprise any suitable structure, such as, for example, a bar, plate, roller (e.g., whether stationary or rotating), and/or the like. In instances where a rotating pressing element is used—or any other rotating element that contacts fibers—a guard, barrier, or blade may be positioned against the rotating element to prevent fibers from wrapping around the rotating element.

Figure 10A:
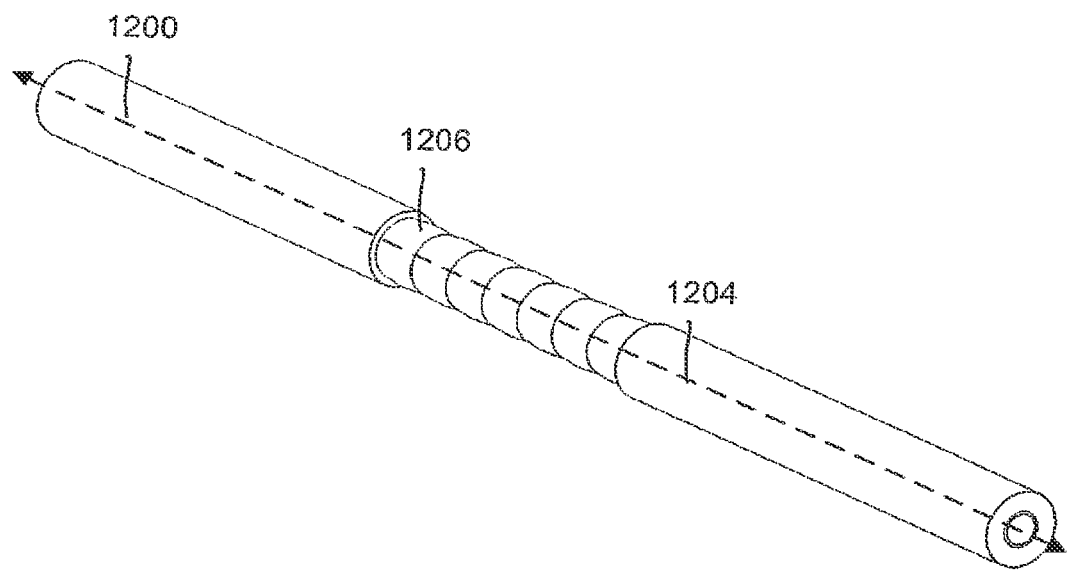
FIGS. 10A and 10B are perspective and front views, respectively, of a rubbing element of the present disclosure.
Figure 10B:
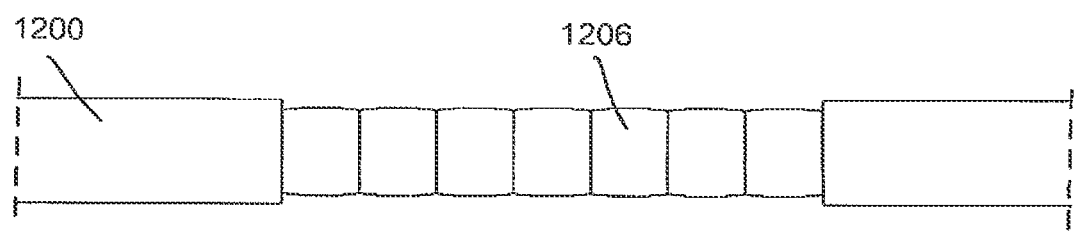

Impregnation section 510 includes one or more rubbing elements (e.g., 916, 920, 924, and/or the like) configured to facilitate dispersion of the one or more spreaded fiber layers within the matrix material. FIGS. 10A and 10B depict a rubbing element 1200, which may be representative of rubbing elements 916, 920, and 924. Rubbing element 1200 includes two or more convexities 1206 disposed along a longitudinal axis 1204 of the rubbing element. Due to convexities 1206, rubbing element 1200 can have a profile, taken parallel to longitudinal axis 1204, that includes curved portions, which can collectively form a larger portion of the profile that may be characterized as fluctuating and/or undulating (e.g., in distance from the longitudinal axis). Convexities 1206 of rubbing element 1200 each include an ellipsoidal surface; however, convexities (e.g., 1206) of a rubbing element (e.g., 1200) may have any suitable shape. Rubbing element 1200 comprises a bar (e.g., the rubbing element is rod-shaped); however, in other embodiments, a rubbing element may comprise a plate.

One or more rubbing elements (e.g., 916, 920, 924, and/or the like) may each be movable relative to spreaded fiber layer(s) being processed by impregnation section 510 in a direction that is substantially perpendicular to a long dimension of the spreaded fiber layer(s). For example, impregnation section 510 can include a frame to which the one or more rubbing elements may be coupled, and each of the rubbing element(s) can be movable relative to the frame in a direction that is substantially aligned with the longitudinal axis of the rubbing element. Rubbing elements may be configured to oscillate, for example, at any of the amplitudes and frequencies described above for spreading elements 604A-604D. Each rubbing element (e.g., 916, 920, 924, and/or the like) is configured to contact at least one of the one or more spreaded fiber layers after the spreaded fiber layer has been pressed into the matrix material.

As shown in FIG. 9, spreaded fiber layers 901 and 902 can be guided by rollers 606, if present, to extruder 906. Spreaded fiber layers 901 and 902 can include the same or differing types of fibers and can have the same or differing widths. Extruder 906 may supply a sheet or film of matrix material to at least one of spreaded fiber layers 901 and 902, such as, for example, to an upper surface of spreaded fiber layer 902 to form a coated spreaded fiber layer 910. Spreaded fiber layer 901 may be brought into contact with coated spreaded fiber layer 910 and may be pressed into the matrix material by passing over pressing element 908. Coated spreaded fiber layer 910 may be pressed into the matrix material by passing over pressing element 914. The spreaded fiber layers, coupled by the matrix material, may be passed over rubbing element 916, which may be oscillating, to facilitate dispersion of the spreaded fiber layers into the matrix material. In this example, the coupled spreaded fiber layers may be further passed over pressing element 918, over rubbing element 920, over pressing element 922, over rubbing element 924, and over pressing element 923. In some instances, the coupled spreaded fiber layers can be passed over a plate 925 and/or be directed to a pressing device 926 including one or more consolidation rollers 928. A fiber-reinforced composite 200 from impregnation section 510 can be processed by shaping unit 512 and/or provided to winder 514. In some embodiments, only one spreaded fiber layer (e.g., 901 or 902) is processed by impregnation section 510.

Figure 11:
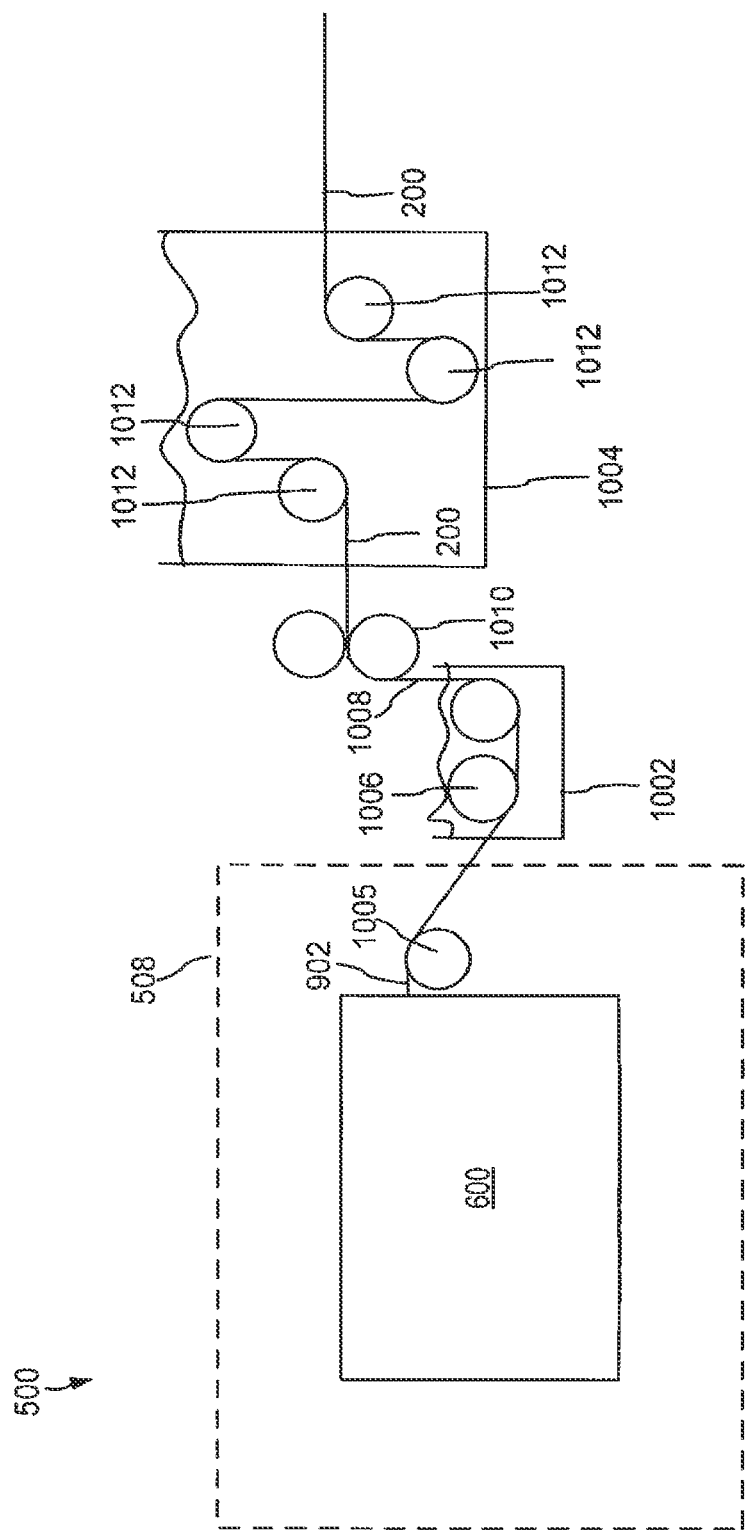
FIG. 11 is a schematic depicting one embodiment for processing spreaded fiber layer(s) to form a unidirectional fiber-reinforced composite.

Referring now to FIG. 11, in some embodiments, an impregnation section 510 includes a matrix material bath 1002. As shown, spreaded fiber layer 902 can be passed through matrix material bath 1002, which can be facilitated by stationary or rotating rollers (e.g., 1004, 1006, and/or the like), to form coated spreaded fiber layer 1008. Coated spreaded fiber layer 1008 may be consolidated, for example, by pressing (e.g., via consolidation rollers 1010) to form fiber-reinforced composite 200. Fiber-reinforced composite 200 may be passed through a solvent recovery bath 1004 to remove any free matrix material, which can be facilitated by stationary or rotating rollers (e.g., 1012 and/or the like).

EXAMPLES

The present invention will be described in greater detail by way of specific examples. The following examples are offered for illustrative purposes only and are not intended to limit the invention in any manner. Those of skill in the art will readily recognize a variety of noncritical parameters which can be changed or modified to yield essentially the same results.

Example 1

Sample Tapes of the Present Disclosure and Comparative Tapes

Figure 12:
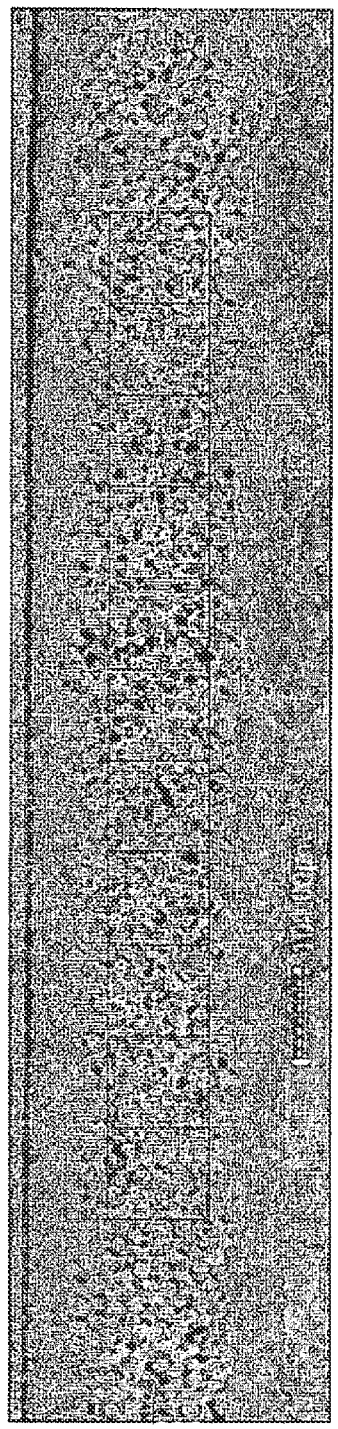
FIGS. 12-14 are cross-sectional confocal microscope images of unidirectional fiber-reinforced composites of the present disclosure.
Figure 13:
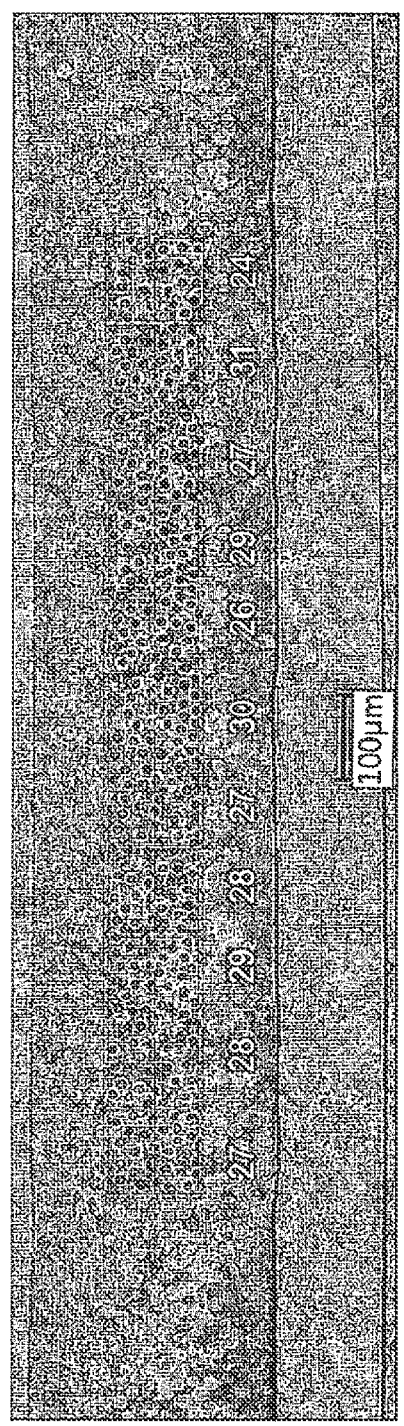
Figure 14:
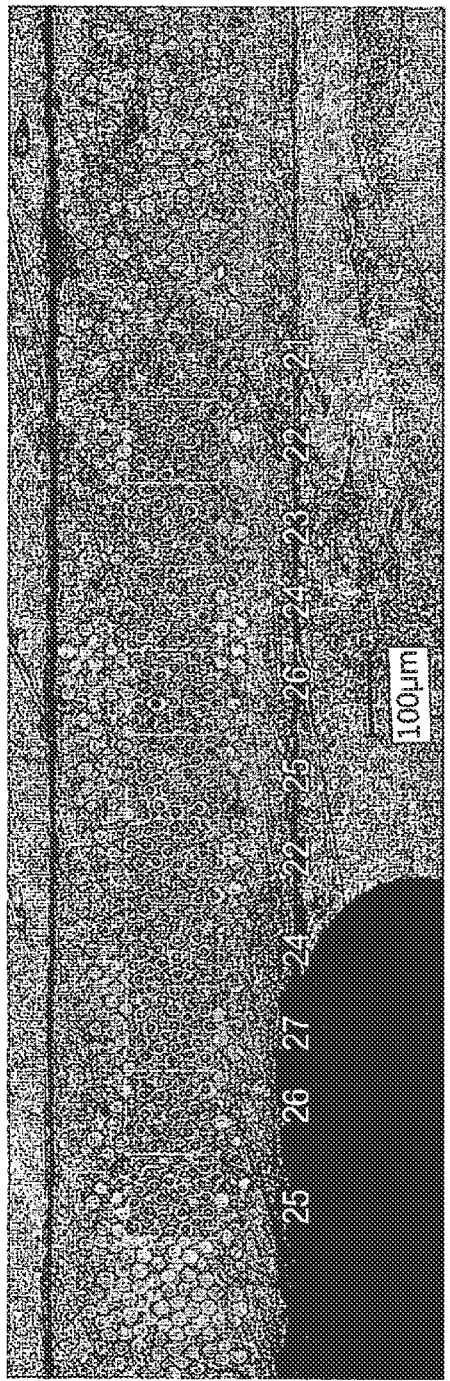

Unidirectional glass fiber tapes of the present disclosure (samples 1-3 or S1-S3) were prepared using the spreading and impregnation units described above. For S1-S3, the glass fibers have an average diameter of 17 μm. For S, the polymer used to form the matrix was polypropylene, for S2, the polymer used to form the matrix material was high-density polyethylene, and, for S3, the polymer used to form the matrix material was polyamide 6 (Aegis® H8202NLB). FIGS. 12-14 are cross-sectional confocal microscope images of S1, S2, and S3, respectively, the images being obtained by a Keyence VK-X200 camera with a 50× lens.

Figure 15:
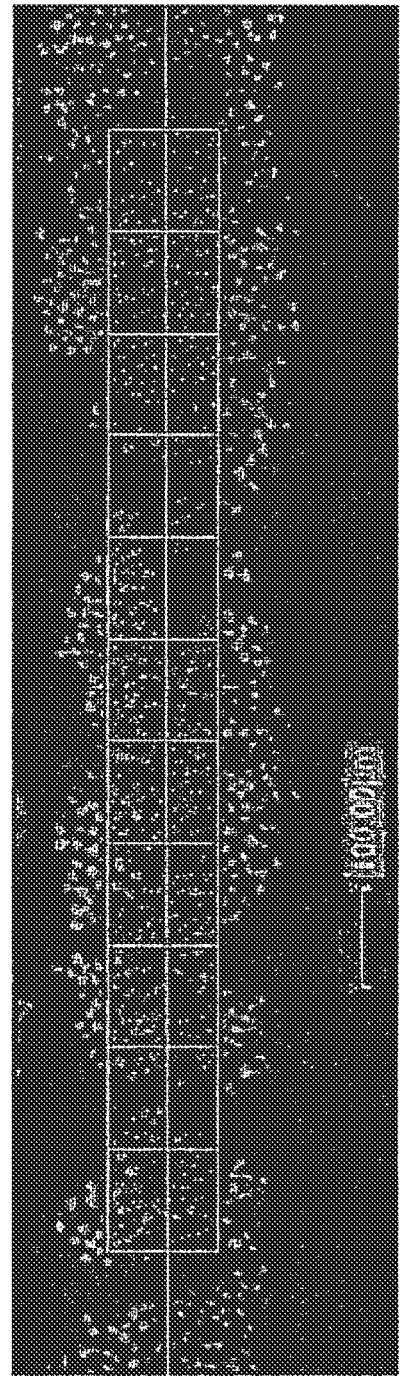
FIGS. 15-17 are cross-sectional confocal microscope images of unidirectional fiber-reinforced composites that are comparative to those of the present disclosure.
Figure 16:
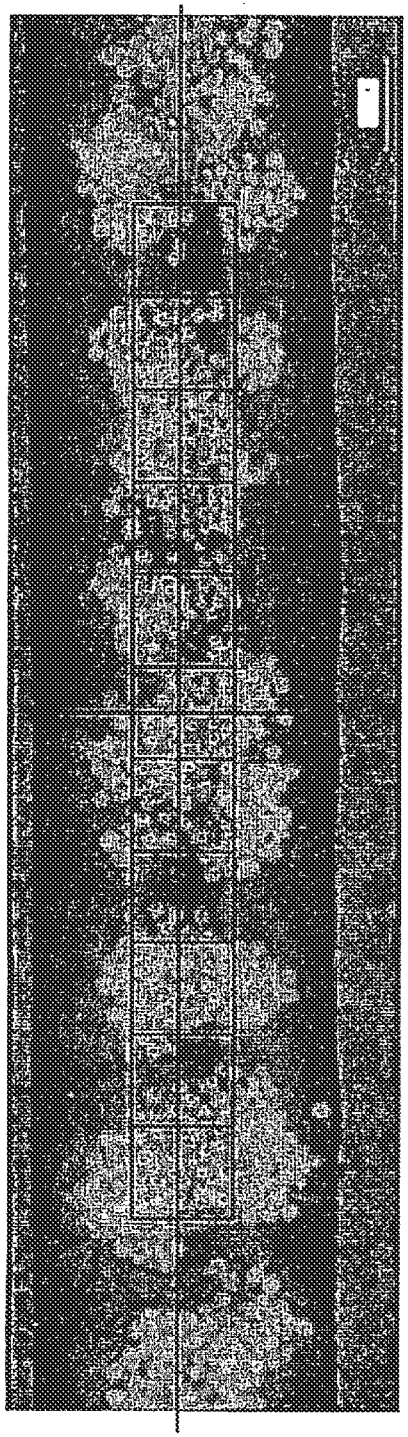
Figure 17:
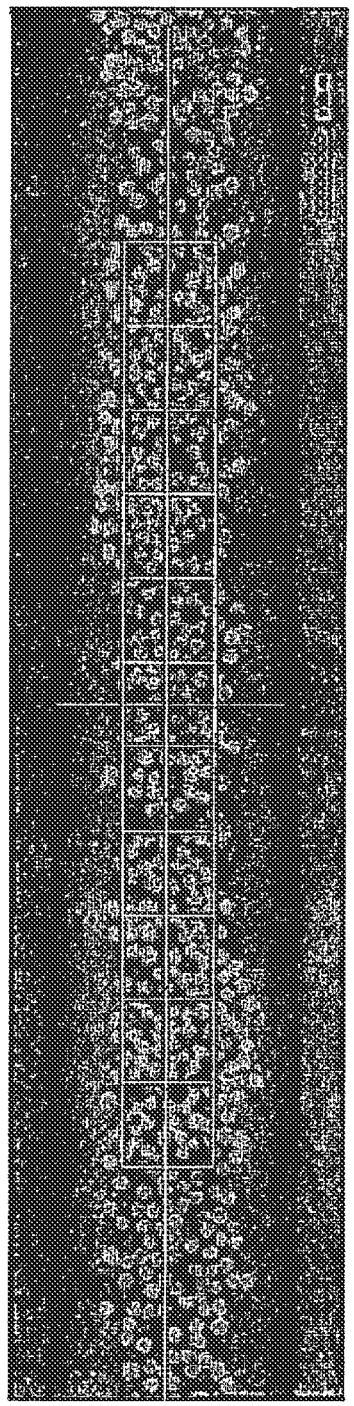
Figure 18:
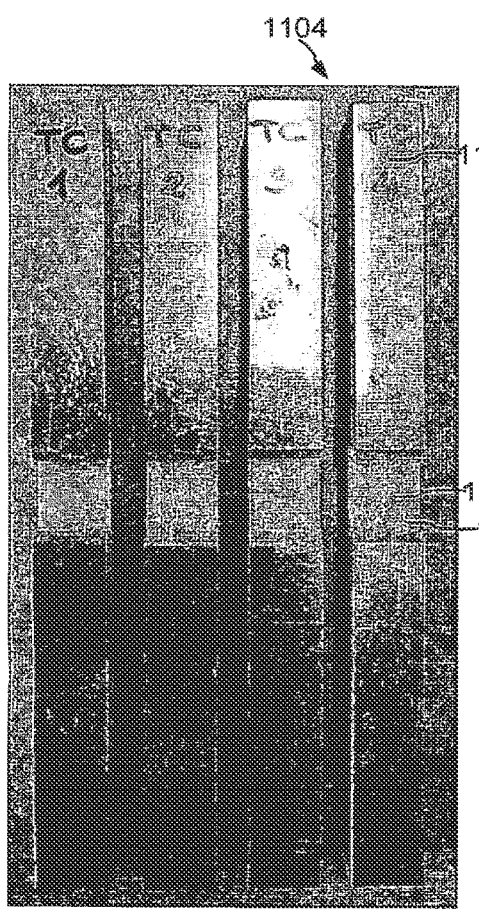
FIGS. 18 and 19 are front and side views, respectively, of test samples, each including a laminate formed from unidirectional tapes of the present disclosure.
Figure 19:

Three comparative commercially available glass fiber tapes (comparatives 1-3 or C1-C3) were also analyzed. Sample C1 has an average filament diameter of 13 μm, and samples C2 and C3 have an average filament diameter of 17 μm. FIGS. 15-17 are cross-sectional confocal microscope images of C1, C2 and C3, respectively.

The uniform densities of S1-S3 and C1-C3 were determined in the manner outlined above in the section of the specification titled "Determining Density Uniformity." For S1, the RFAC (%) and COV (%) values are 82.3 and 4.0, respectively. For S2, the RFAC (%) and COV (%) values are 80.4 and 7.0, respectively. For S3, the RFAC (%) and COV (%) values are 69.7 and 8.0, respectively. For C1, the RFAC (%) and COV (%) values are 47.3 and 25.3, respectively. For C2, the RFAC (%) and COV (%) values are 65.7 and 32.4, respectively. For C3, the RFAC (%) and COV (%) values are 55.5 and 9.2, respectively.

Tables 1-3 provide the data points for S1-S3, respectively, and tables 4-6 provide the data points for C1-C3, respectively. The theoretical maximum possible coverage, assuming close packing of circular filaments within a square, is 78.5%, which is calculated as the area of the circular filaments divided by the area of square. For example, for a circular filament with a radius 'r' within a square having a side '2r,' the coverage equals $\pi r^2/(2r)^2$.

TABLE 1

(Sample S1 Data Points)

| Box | Fiber Count | Fiber Area ($cm^2$) | Square Area ($cm^2$) | Fiber Percent Coverage* |
|---|---|---|---|---|
| 1 | 30 | 6.8094E−05 | 0.0001 | 68.1 |
| 2 | 30 | 6.8094E−05 | 0.0001 | 68.1 |
| 3 | 29 | 6.58242E−05 | 0.0001 | 65.8 |
| 4 | 29 | 6.58242E−05 | 0.0001 | 65.8 |
| 5 | 27 | 6.12846E−05 | 0.0001 | 61.3 |
| 6 | 27 | 6.12846E−05 | 0.0001 | 61.3 |
| 7 | 28 | 6.35544E−05 | 0.0001 | 63.6 |
| 8 | 28 | 6.35544E−05 | 0.0001 | 63.6 |
| 9 | 27 | 6.12846E−05 | 0.0001 | 61.3 |
| 10 | 29 | 6.58242E−05 | 0.0001 | 65.8 |
| 11 | 29 | 6.58242E−05 | 0.0001 | 65.8 |

*Average of boxes 1 to 11 is 64.6. Therefore, (64.6/78.5) × 100 = an RFAC of 82.3. Standard deviation for boxes 1 to 11 is 2.6. Therefore, (2.6/64.6) × 100 = a COV of 4.0.

TABLE 2

(Sample S2 Data Points)

| Box | Fiber Count | Fiber Area ($cm^2$) | Square Area ($cm^2$) | Fiber Percent Coverage* |
|---|---|---|---|---|
| 1 | 27 | 6.12846E−05 | 0.0001 | 61.3 |
| 2 | 28 | 6.35544E−05 | 0.0001 | 63.6 |
| 3 | 29 | 6.58242E−05 | 0.0001 | 65.8 |
| 4 | 28 | 6.35544E−05 | 0.0001 | 63.6 |
| 5 | 27 | 6.12846E−05 | 0.0001 | 61.3 |
| 6 | 30 | 6.80940E−05 | 0.0001 | 68.1 |
| 7 | 26 | 5.90148E−05 | 0.0001 | 59.0 |
| 8 | 29 | 6.58242E−05 | 0.0001 | 65.8 |
| 9 | 27 | 6.12846E−05 | 0.0001 | 61.3 |
| 10 | 31 | 7.03638E−05 | 0.0001 | 70.4 |
| 11 | 24 | 5.44752E−05 | 0.0001 | 54.5 |

*Average of boxes 1 to 11 is 63.1. Therefore, (63.1/78.5) × 100 = an RFAC of 80.4. Standard deviation for boxes 1 to 11 is 4.4. Therefore, (4.4/63.1) × 100 = a COV of 7.0.

TABLE 3

(Sample S3 Data Points)

| Box | Fiber Count | Fiber Area ($cm^2$) | Square Area ($cm^2$) | Fiber Percent Coverage* |
|---|---|---|---|---|
| 1 | 25 | 5.6745E−05 | 0.0001 | 56.7 |
| 2 | 26 | 5.90148E−05 | 0.0001 | 59.0 |
| 3 | 27 | 6.12846E−05 | 0.0001 | 61.3 |
| 4 | 24 | 5.44752E−05 | 0.0001 | 54.5 |
| 5 | 22 | 4.99356E−05 | 0.0001 | 49.9 |
| 6 | 25 | 5.67450E−05 | 0.0001 | 56.7 |
| 7 | 26 | 5.90148E−05 | 0.0001 | 59.0 |
| 8 | 24 | 5.44752E−05 | 0.0001 | 54.5 |
| 9 | 23 | 5.22054E−05 | 0.0001 | 52.2 |
| 10 | 22 | 4.99356E−05 | 0.0001 | 49.9 |
| 11 | 21 | 4.76658E−05 | 0.0001 | 47.7 |

*Average of boxes 1 to 11 is 54.7. Therefore, (54.7/78.5) × 100 = an RFAC of 69.7. Standard deviation for boxes 1 to 11 is 4.4. Therefore, (4.4/54.7) × 100 = a COV of 8.0.

TABLE 4

(Comparative Sample C1 Data Points)

| Box | Fiber Count | Fiber Area ($cm^2$) | Square Area ($cm^2$) | Fiber Percent Coverage* |
|---|---|---|---|---|
| 1 | 32 | 4.25E−05 | 0.0001 | 42.5 |
| 2 | 17 | 2.26E−05 | 0.0001 | 22.6 |
| 3 | 24 | 3.19E−05 | 0.0001 | 31.9 |
| 4 | 31 | 4.11E−05 | 0.0001 | 41.1 |
| 5 | 37 | 4.91E−05 | 0.0001 | 49.1 |
| 6 | 31 | 4.11E−05 | 0.0001 | 41.1 |
| 7 | 21 | 2.79E−05 | 0.0001 | 27.9 |
| 8 | 17 | 2.26E−05 | 0.0001 | 22.6 |
| 9 | 33 | 4.38E−05 | 0.0001 | 43.8 |
| 10 | 35 | 4.65E−05 | 0.0001 | 46.5 |
| 11 | 30 | 3.98E−05 | 0.0001 | 39.8 |

*Average of boxes 1 to 11 is 37.2. Therefore, (37.2/78.5) × 100 = an RFAC of 47.3. Standard deviation for boxes 1 to 11 is 9.4. Therefore, (9.4/37.2) × 100 = a COV of 25.3.

TABLE 5

(Comparative Sample C2 Data Points)

| Box | Fiber Count | Fiber Area ($cm^2$) | Square Area ($cm^2$) | Fiber Percent Coverage* |
|---|---|---|---|---|
| 1 | 28 | 6.36E−05 | 0.0001 | 63.6 |
| 2 | 16 | 3.63E−05 | 0.0001 | 36.3 |
| 3 | 30 | 6.81E−05 | 0.0001 | 68.1 |
| 4 | 11 | 2.5E−05 | 0.0001 | 25.0 |
| 5 | 21 | 4.77E−05 | 0.0001 | 47.7 |
| 6 | 28 | 6.36E−05 | 0.0001 | 63.6 |
| 7 | 29 | 6.58E−05 | 0.0001 | 65.8 |
| 8 | 25 | 5.67E−05 | 0.0001 | 56.7 |
| 9 | 29 | 6.58E−05 | 0.0001 | 65.8 |
| 10 | 23 | 5.22E−05 | 0.0001 | 52.2 |
| 11 | 10 | 2.27E−05 | 0.0001 | 22.7 |

*Average of boxes 1 to 11 is 51.6. Therefore, (51.6/78.5) × 100 = an RFAC of 65.7. Standard deviation for boxes 1 to 11 is 16.7. Therefore, (16.7/51.6) × 100 = a COV of 32.4.

TABLE 6

(Comparative Sample C3 Data Points)

| Box | Fiber Count | Fiber Area ($cm^2$) | Square Area ($cm^2$) | Fiber Percent Coverage* |
|---|---|---|---|---|
| 1 | 21 | 4.77E−05 | 0.0001 | 47.7 |
| 2 | 21 | 4.77E−05 | 0.0001 | 47.7 |
| 3 | 19 | 4.31E−05 | 0.0001 | 43.1 |
| 4 | 18 | 4.09E−05 | 0.0001 | 40.9 |
| 5 | 17 | 3.86E−05 | 0.0001 | 38.6 |
| 6 | 18 | 4.09E−05 | 0.0001 | 40.9 |
| 7 | 17 | 3.86E−05 | 0.0001 | 38.6 |
| 8 | 22 | 4.99E−05 | 0.0001 | 49.9 |
| 9 | 19 | 4.31E−05 | 0.0001 | 43.1 |

TABLE 6-continued (Comparative Sample C3 Data Points)

| Box | Fiber Count | Fiber Area (cm$^2$) | Square Area (cm$^2$) | Fiber Percent Coverage* |
|---|---|---|---|---|
| 10 | 21 | 4.77E−05 | 0.0001 | 47.7 |
| 11 | 18 | 4.09E−05 | 0.0001 | 40.9 |

*Average of boxes 1 to 11 is 43.5. Therefore, (43.5/78.5) × 100 = an RFAC of 55.5. Standard deviation for boxes 1 to 11 is 4.0. Therefore, (4.0/43.5) × 100 = a COV of 9.2.

Example 2

Process to Make S1

Samples S1-S3 were prepared using the spreading and impregnation units described above. The following includes anon-limiting explanation of the procedure used to make sample S1.

A desired number of fiber bundles are introduced into the UD tape production line. Fibers from the fiber bundles are continuously pulled through the production line by a pulling station located at the end of the production line. The fibers are separated into two groups, one of which is processed by the lower section of the spreading unit to produce a lower spreaded fiber layer and the other of which is processed by the upper section of the spreading unit to produce an upper spreaded fiber layer. A polymer matrix material is brought into contact with the top surface of the lower spreaded fiber layer. The upper and lower spreaded fiber layers are combined and pressed into the matrix material by passing over a series of pins. The combined spreaded fiber layers are consolidated into a UD tape, which is wound around a spool. Line speed used to make sample S1 was 8 m/s.

Example 3

Testing of Laminates Comprising Tapes of the Present Disclosure

Referring now to FIGS. 18-22, compression testing of laminates comprising tapes of the present disclosure was performed. Four test samples 1104 were prepared, each including a UD laminate 1120 having fibers aligned with a long dimension of the laminate. Each laminate 1120 was formed from a 4 mm thick lay-up of UD tapes of the present disclosure, each having glass fibers dispersed within a polypropylene matrix material. Each laminate 1120 was cut to a length of 140 mm and a width of 12 mm using a water jet cutter. To prepare each laminate 1120 for testing, aluminum tabs 1116 were adhered to the laminate at opposing laminate ends 1112 using 3M Scotch-Weld DP8005. Prior to adhesion of aluminum tabs 1116, each laminate end 1112 was scuffed and degreased. For each test sample 1104, a gage section 1108 was defined between opposing sets of aluminum tabs 1116.

Figure 20:
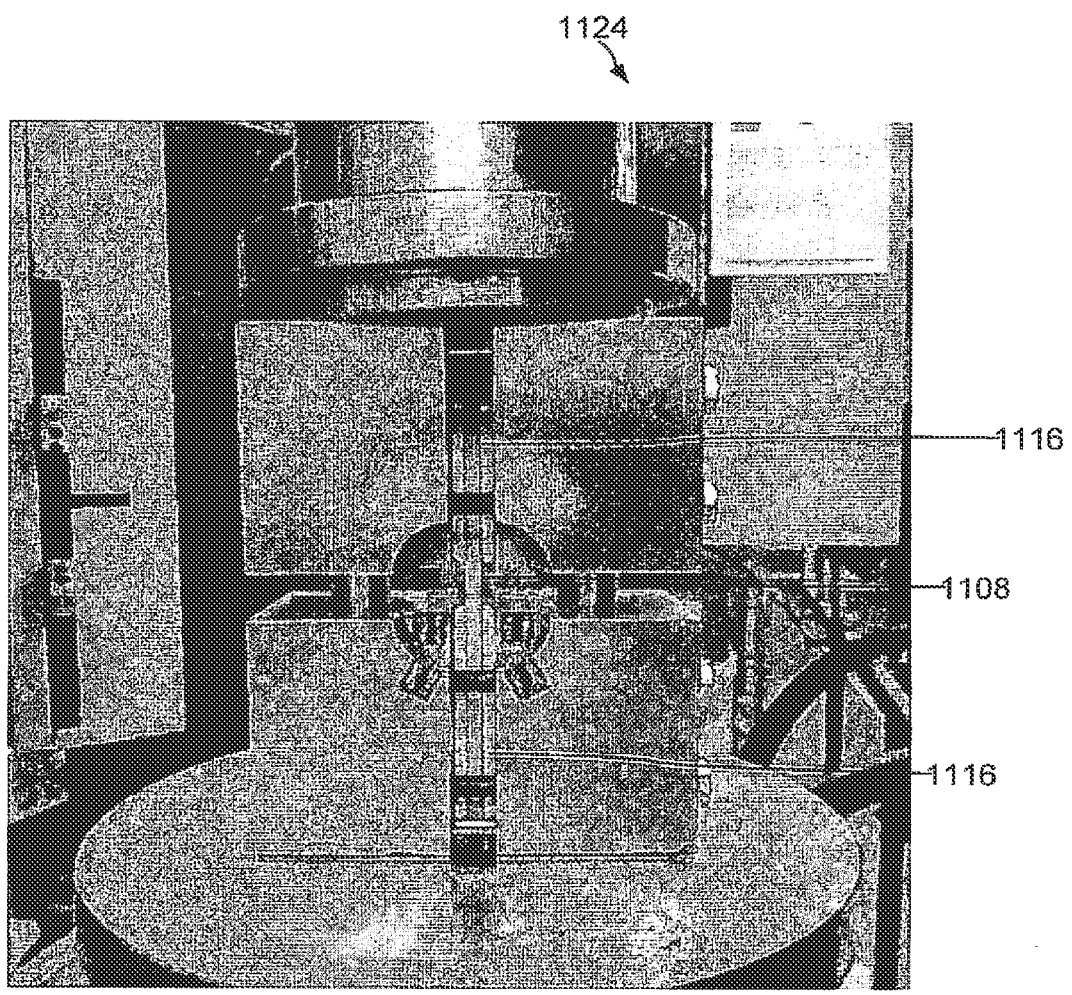
FIG. 20 depicts an apparatus suitable for testing the test samples of FIGS. 18 and 19.
Figure 21:
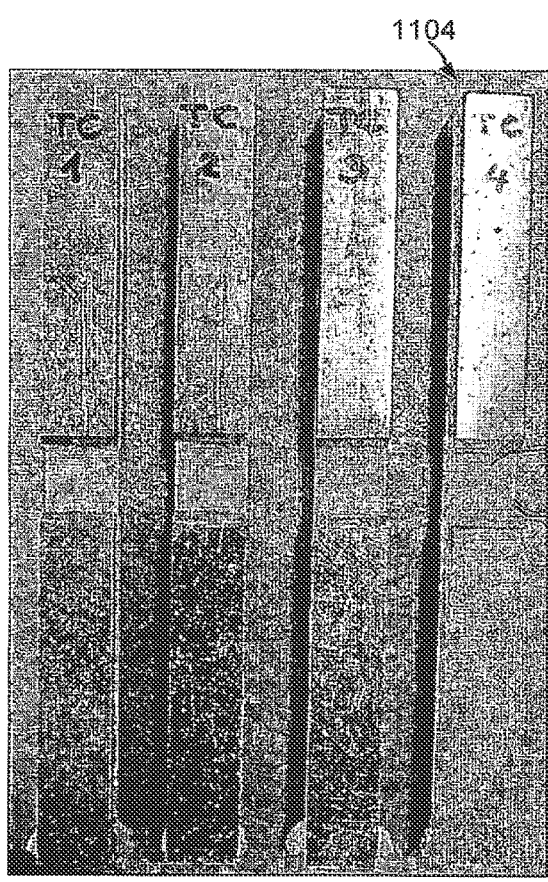
FIGS. 21 and 22 depict the test samples of FIGS. 18 and 19, after testing.
Figure 22:
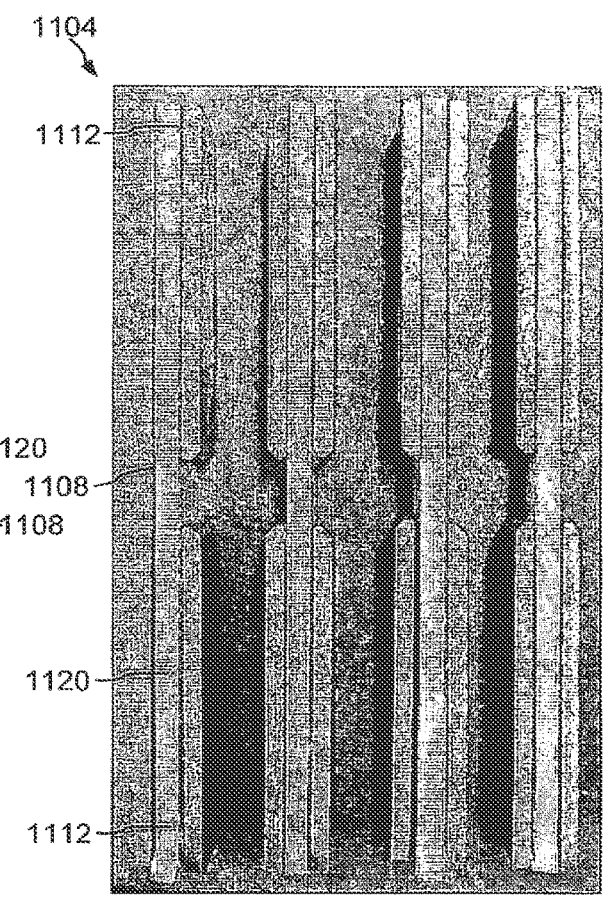

Samples 1104 were compression tested until failure using a Zwick 250 kN testing apparatus 1124 (FIG. 20). The mean compression strength of samples 1104 was 456 MPa, with a standard deviation of 45.4 MPa. As shown in FIGS. 21 and 22, for each sample 1104, failure occurred at one of laminate ends 1112 rather than at gage section 1108, which may be attributed to de-bonding between the laminate end and respective aluminum tab(s) 1116. It is anticipated that, through use of more robust tabs (e.g., forming the tabs with the laminate, molding the tabs onto the laminate, welding the tabs to the laminate, and/or the like), higher compression strength test results could be achieved.

The above specification and examples provide a complete description of the structure and use of illustrative embodiments. Although certain embodiments have been described above with a certain degree of particularly, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather they include all modifications and alternatives falling within the scope of the claims, and embodiments other than the one shown may include some or all of the features of the depicted embodiment. For example, elements may be omitted or combined as a unitary structure and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An impregnation unit configured to receive at least first and second spreaded fiber layers and to disperse the first and second spreaded fiber layers into a matrix material, the impregnation unit comprising:
    an extruder configured to supply a sheet or film of the matrix material between the first and second spreaded fiber layers;
    a first pressing element disposed downstream of the extruder, the first pressing element having a convex surface configured to press the first spreaded fiber layer into the matrix material;
    a second pressing element disposed downstream of the extruder, the second pressing element having a convex surface configured to press the second spreaded fiber layer into the matrix material;
    a frame; and
    one or more rubbing elements coupled to the frame, each having one or more convexities disposed along a longitudinal axis of the rubbing element
    wherein each of the one or more rubbing elements is movable relative to the frame in a direction that is substantially aligned with the longitudinal axis of the rubbing element and
    wherein each of the one or more rubbing elements is configured to contact at least one of the first and second spreaded fiber layers after the spreaded fiber layer has been pressed into the matrix material.

2. The impregnation unit of claim 1, wherein the second pressing element is disposed downstream of the first pressing element.

3. The impregnation unit of claim 1, wherein each of the first and second pressing elements comprise a bar or a plate.

4. The impregnation unit of claim 1, wherein at least one of the first and second pressing elements is configured to be heated.

5. The impregnation unit of claim 1, comprising a heat source configured to melt the sheet or film of the matrix material.

6. An impregnation unit configured to receive one or more spreaded fiber layers and to disperse the one or more spreaded fiber layers into a matrix material, the impregnation unit comprising:
- an extruder configured to supply a sheet or film of the matrix material;
- one or more pressing elements disposed downstream of the extruder, each having a convex surface configured to press at least one of the one or more spreaded fiber layers into the matrix material;
- a frame; and
- one or more rubbing elements coupled to the frame, each having one or more convexities disposed along a longitudinal axis of the rubbing element;
- wherein each of the one or more rubbing elements is movable relative to the frame in a direction that is substantially aligned with the longitudinal axis of the rubbing element; and
- wherein each of the one or more rubbing elements is configured to contact at least one of the one or more spreaded fiber layers after the spreaded fiber layer has been pressed into the matrix material.

7. The impregnation unit of claim 6, wherein:
the extruder is configured to supply the sheet or film of a matrix material between first and second ones of the one or more spreaded fiber layers; and
the one or more pressing elements comprises:
- a first pressing element configured to press the first spreaded fiber layer into the matrix material; and
- a second pressing element configured to press the second spreaded fiber layer into the matrix material.

8. The impregnation unit of claim 7, wherein the second pressing element is disposed downstream of the first pressing element.

9. The impregnation unit of claim 6, wherein, for each of the one or more rubbing elements, each of the one or more convexities comprises an ellipsoidal surface.

10. The impregnation unit of claim 6, wherein each of the one or more rubbing elements comprises a bar or a plate.

11. The impregnation unit of claim 6, wherein at least one of the one or more rubbing elements is configured to be heated.

* * * * *